(12) United States Patent
Hu

(10) Patent No.: US 8,363,945 B2
(45) Date of Patent: Jan. 29, 2013

(54) SIMILAR SEMICIRCLE DETECTING APPARATUS AND COMPUTER-READABLE STORAGE MEDIUM STORING SIMILAR SEMICIRCLE DETECTING PROGRAM

(75) Inventor: Xuebin Hu, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 987 days.

(21) Appl. No.: 12/406,353

(22) Filed: Mar. 18, 2009

(65) Prior Publication Data

US 2009/0245656 A1  Oct. 1, 2009

(30) Foreign Application Priority Data

Mar. 25, 2008  (JP) .................................. 2008-078751

(51) Int. Cl.
*G06K 9/00* (2006.01)
(52) U.S. Cl. ........................................ 382/181; 382/203
(58) Field of Classification Search .................. 382/181, 382/203
See application file for complete search history.

(56) References Cited

U.S. PATENT DOCUMENTS

| | | | | |
|---|---|---|---|---|
| 4,748,676 | A | * | 5/1988 | Miyagawa et al. ........... 382/206 |
| 5,797,396 | A | * | 8/1998 | Geiser et al. .................. 382/128 |
| 6,418,238 | B1 | * | 7/2002 | Shiratani et al. .............. 382/128 |
| 7,400,758 | B2 | * | 7/2008 | Shi et al. ........................ 382/132 |

OTHER PUBLICATIONS

Jun-ichi Hasegawa, Taketoshi Tsutsui and Jun-ichiro Toriwaki, "Automated Extraction of Cancer Lesions with Convergent Fold Patterns in Double Contrast X-Ray Images of the Stomach" Systems and Computers in Japan, vol. 22 Issue No. 7, pp. 51-62, 1991.*
Hidefumi Kobatake, "Convergence Index Filter for Vector Fields", IEEE Transactions on Image Processing, vol. 8 Issue No. 8, pp. 1029-1038, Aug. 1999.*
Sumiaki Matsumoto, Harold L. Kundel, James C. Gee, Warren B. Gefter and Hiroto Hatabu, "Pulmonary Nodule Detection in CT Images with Quantized Convergence Index Filter, Medical Image Analysis, vol. 10 Issue No. 3,"pp. 343-352, Jun. 2006.*
Wei et al., "Characteristics Analysis of Convergence Index Filters," The Institute of Electronics, Information and Communication Engineers (IEICE) Trans. D-II, vol. J84-D-II, No. 7, Jul. 2001, pp. 1289-1298, 12 pages including English Summary and Brief Explanation.
Hasegawa et al., "Automated Extraction of Cancer Lesions with Convergent Fold Patterns in Double Contrast X-Ray Images of Stomach," IEICE Trans. D-II, vol. J73-D-II, No. 4, Apr. 1990, pp. 661-669, 6 pages with English Summary.

* cited by examiner

*Primary Examiner* — Eric Rush
(74) *Attorney, Agent, or Firm* — Sughrue Mion, PLLC

(57) ABSTRACT

The present invention performs a process of integrating plural pixel evaluation values corresponding to plural evaluation pixels on a circular arc overlapping a circle using a predetermined pixel in interest as its center and calculating an integrated evaluation value to evaluate whether the circular arc is a circular arc corresponding to a similar semicircular shape, for each of plural circular arcs that overlap the circle in overlapping phases which are different from each other, compares plural integrated evaluation values corresponding to the plural circular arcs, and extracts the circular arc with which the integrated evaluation value indicating the most approximation to the similar semicircular shape is associated, from the plural circular arcs.

9 Claims, 15 Drawing Sheets

FIG. 15

|      | QR1  | QR2  | ...... | QR8  | ...... | QR15 | QR16 |
|------|------|------|--------|------|--------|------|------|
| PQ1  | 0    | 22.5 |        | 22.5 |        | 45.0 | 22.5 |
| PQ2  | 22.5 | 0    |        | 45.0 |        | 67.5 | 45.0 |
| ...  |      |      |        |      |        |      |      |
| PQ4  | 67.5 | 22.5 |        | 90.0 |        | 67.5 | 90.0 |
| ............ |  |  |        |      |        |      |      |
| PQ15 | 45.0 | 67.5 |        | 22.5 |        | 0    | 22.5 |
| PQ16 | 22.5 | 45.0 |        | 0    |        | 22.5 | 0    |

FIRST VALUE / SECOND VALUE / 70

SIMILAR SEMICIRCLE DETECTING APPARATUS AND COMPUTER-READABLE STORAGE MEDIUM STORING SIMILAR SEMICIRCLE DETECTING PROGRAM

BACKGROUND OF THE INVENTION

1. Field of the Invention

The present invention relates to a similar semicircle detecting apparatus that detects a similar semicircular shape similar to a semicircular shape from an image represented by pixels that are two-dimensionally arranged, and a computer-readable storage medium storing a similar semicircle detecting program that causes a computer to operate as the similar semicircle detecting apparatus.

2. Description of the Related Art

Conventionally, security cameras are disposed in convenience stores or banks as one of security countermeasures. Moving pictures that are photographed by the security cameras are displayed on a display screen of a monitoring room or the like and are recorded. The moving pictures are used to specify a criminal when a crime is committed.

Moving pictures that are photographed by the security cameras are recorded as analog data, conventionally. However, in recent years, the moving pictures are recorded as digital data, for convenience of management and the like. In addition, in the security cameras that have the utilization objects described above, the moving pictures that are photographed over a long period of time need to be recorded, but there is a limitation in a recording capacity of a recording device that records the moving pictures. For this reason, when the moving pictures are recorded, a compressing process is applied to the moving pictures. Meanwhile, if the compressing process is applied to the moving pictures, the moving pictures may become unclear. If the moving pictures become unclear, it may be difficult to grasp an accurate occurrence situation of an event or specify a person from the moving pictures.

In recent years, in a field of an imaging apparatus that lays stress on a digital camera, with the development of a hardware technique of the imaging apparatus, a software technique of the imaging apparatus has been developed. One example of the software technique is a technique for detecting a face portion of a person in an angle of view, that is, a so-called face detecting technique. In the face detecting technique, generally, face parts, such as eyes, a nose, and a mouth, which become markers of the face portion in the angle of view, are detected, and the face portion in the angle of view is detected on the basis of the detected face parts.

When the face detecting technique is applied to the security camera, it is possible to detect a face portion of a person in an angle of view, when the moving pictures are taken. In addition, when the moving pictures are recorded, a high compressing process can be applied to only an area other than the detected face portion. As a result, the security camera is considered to be obtained, in which the face portion of the person in the recorded moving pictures becomes clear, and a person who turns a front surface with respect to the security camera can be easily specified.

Here, in order to effectively use the moving pictures that are taken by the security cameras to specify the person, it is important that when the person who turns a front surface with respect to the security camera can be easily specified and it is also important that when the person who turns a side surface or a back surface with respect to the security camera can be easily specified. For this reason, in addition to the face portion of the person, that is, the front surface of the person, and the head portion of the person including the front surface, the side surface, and the back surface of the person need to be detected. If the head portion can be detected in the moving pictures, the detected head portion can be traced in the angle of view, and can be effectively used to specify the person. However, the face detecting technique is a technique for detecting the face portion in the angle of view on the basis of the detected face parts. Accordingly, even though the face detecting technique is applied, it is difficult to detect a side surface or a back surface of a person who has a small amount of features in face portions, such as eyes, a nose, and a mouth, which become markers of the face portion.

In addition, conventionally, various techniques that detect a similar circular shape having a rounded outline using a point concentration filter to evaluate concentration degree of a gradient vectors in a peripheral area of a pixel in interest have been suggested (for example, see Wei et al., Characteristic Analysis of Point Concentricity Filter of Gradient Vector, "The Institute of Electronics, Information and Communication Engineers (IEICE) Trans. D-II Vol. J84-D-II No. 7", July, 2001, p. 1289-1298 and Junichi Hasegawa et al., Automatic Extraction of Cancer Lesion Portion accompanied by Fold Concentration in Double Contrast Gastrography X-ray Image, "IEICE Trans. D-II Vol. J73-D-II No. 4", April, 1990, p. 661-669).

The techniques that detect the similar circular shape using the point concentration filter are techniques that calculate a gradient direction where a characteristic amount, such as a luminance value or a chromaticity value in an image, varies, for each of plural evaluation pixels that are arranged along a circle using a predetermined pixel in interest as its center and surround the predetermined pixel in interest, calculate a pixel evaluation value based on an angle that is formed by a direction in which the evaluation pixel and the pixel in interest are connected and a gradient direction, for each of the plural evaluation pixels, and evaluate whether the evaluation pixels are pixels on a circle using the pixel in interest as its center on the basis of the calculated pixel evaluation values so as to detect the similar circular shape.

In addition, since the techniques that detect the similar circular shape using the point concentration filter are techniques that principally function even though the contrast between the similar circular shape as a detection object and a background of the similar circular shape is extraordinarily low, the techniques have been put to practical use in a field of medical image processing like automatic tumor detection that detects an abnormal shadow such as a cancer region having a similar circular shape from an X-ray image or a CT image.

Here, the outline of an upper portion of a head portion of a person has a similar semicircular shape that is similar to a semicircular shape. For this reason, it is anticipated that detection of a similar semicircular shape in an angle of view when a dynamic picture image is photographed is effectively used when the head portion of the person in an angle of view is detected.

However, as described above, the suggested techniques, in Wei et al., Characteristic Analysis of Point Concentricity Filter of Gradient Vector, "The Institute of Electronics, Information and Communication Engineers (IEICE) Trans. D-II Vol. J84-D-II No. 7", July, 2001, p. 1289-1298 and Junichi Hasegawa et al., Automatic Extraction of Cancer Lesion Portion accompanied by Fold Concentration in Double Contrast Gastrography X-ray Image, "IEICE Trans. D-II Vol. J73-D-II No. 4", April, 1990, p. 661-669, that detect the similar circular shape using the point concentration filter are techniques that evaluate whether the evaluation pixels are pixels on the circle using the pixel in interest as its center on the basis of the calculated pixel evaluation values and detect the similar circular shape. Accordingly, the suggested techniques cannot be directly used when the similar semicircular shape is detected.

Further, when the head portion of the person in the angle of view is detected on the basis of detection of the similar semicircular shape, a slope of the similar semicircular shape, that is, a slope of the head portion is very important information in a human body posture analysis. However, the slope of the similar circular shape cannot be obtained by the suggested techniques in Wei et al., Characteristic Analysis of Point Concentricity Filter of Gradient Vector, "The Institute of Electronics, Information and Communication Engineers (IEICE) Trans. D-II Vol. J84-D-II No. 7", July, 2001, p. 1289-1298 and Junichi Hasegawa et al., Automatic Extraction of Cancer Lesion Portion accompanied by Fold Concentration in Double Contrast Gastrography X-ray Image, "IEICE Trans. D-II Vol. J73-D-II No. 4", April, 1990, p. 661-669.

SUMMARY OF THE INVENTION

The present invention has been made in view of the above circumstances and provides a similar semicircle detecting apparatus that can detect a similar semicircle shape similar to a semicircular shape from an image represented by pixels that are two-dimensionally arranged and obtain a slope of the detected similar semicircular shape, and a computer-readable storage medium storing a similar semicircle detecting program that causes a computer to operate as the similar semicircle detecting apparatus.

According to the invention, a similar semicircle detecting apparatus that detects a similar semicircular shape similar to a semicircular shape from an image represented by pixels which are two-dimensionally arranged, the similar semicircle detecting apparatus includes:

a first evaluation value calculating section that calculates a pixel evaluation value to evaluate whether a current evaluation pixel is a pixel on a circular arc in which the predetermined pixel in interest is centered, for each of a plurality of evaluation pixels which are arranged along a circle in which a predetermined pixel in interest is centered and surround the predetermined pixel in interest;

a second evaluation value calculating section that performs a process of integrating plural pixel evaluation values corresponding to the plurality of evaluation pixels on the circular arc overlapping the circle so as to calculate an integrated evaluation value to evaluate whether the circular arc is a circular arc corresponding to a similar semicircular shape, for each of a plurality of circular arcs which overlap the circle in overlapping phases which are different from each other; and a circular arc extracting section that compares a plurality of integrated evaluation values corresponding to the plural circular arcs, and extracts the circular arc with which the integrated evaluation value indicating the most approximation to the similar semicircular shape is associated, from the plural circular arcs.

The "circular arc" according to the invention may be a semicircle of 180°, but may be a circular arc that has an angle of 90°, 270° or the like that is different from the angle of 180°.

In addition, the "pixel evaluation value" according to the invention may be an angle in a range of (0 to 90°) or may be obtained by calculating cosine of the angle in the range of (0 to 90°). Alternatively, the pixel evaluation value according to the invention may be another evaluation value that indicates a degree to which a gradient is oriented to a direction of a pixel in interest.

In addition, the "integrated evaluation value" according to the invention may be equally handled over the entire area of the circular arc. However, a large weight may be given as goes to the center of the circular arc, for example. Alternatively, an evaluation value based on another algorithm, for example, a count value that is obtained by counting the number of evaluation pixels where a gradient direction is oriented to a direction of a pixel in interest in the predetermined angle range (for example, within ±10 degrees) may be used.

The similar semicircle detecting apparatus according to one aspect of the present invention performs a process of integrating plural pixel evaluation values corresponding to plural evaluation pixels on a circular arc overlapping a circle using a predetermined pixel in interest as its center and calculating an integrated evaluation value to evaluate whether the circular arc is a circular arc corresponding to a similar semicircular shape, for each of plural circular arcs that overlap the circle and have phases different from each other, compares plural integrated evaluation values corresponding to the plural circular arcs, and extracts the circular arc with which the integrated evaluation value indicating the most approximation to the similar semicircular shape is associated, from the plural circular arcs. According to the similar semicircle detecting apparatus according to one aspect of the present invention, the similar semicircular shape that is similar to the semicircular shape can be detected from the image represented by the pixels that are two-dimensionally arranged. In addition, since the extracted object is not a circle but a circular arc, a direction in which the predetermined pixel in interest and the center of the extracted circular arc are connected can be specified, and a slope of the detected similar semicircular shape can be obtained from the specified direction.

In the similar semicircle detecting apparatus according to the invention, it is preferable that the first evaluation value calculating section includes:

a gradient direction calculating section that calculates a gradient direction where a characteristic amount on the image varies, for each of the plurality of evaluation pixels; and a pixel evaluation value calculating section that calculates the pixel evaluation value based on an angle which is formed by a direction in which the current evaluation pixel and the pixel in interest and the gradient direction calculated by the gradient direction calculating section, for each of the plurality of evaluation pixels.

In addition, the "characteristic amount" according to the invention may be, for example, a luminance value or a chromaticity value. Alternatively, the characteristic amount according to the invention may be a combination of a luminance value and a chromaticity value. In addition, R, G, and B may be equally handled or a weight may be given to the G.

According to this preferred aspect, the pixel evaluation value according to the invention may be easily calculated.

In a similar semicircle detecting apparatus which is provided with the gradient direction calculating section described above of the similar semicircle detecting apparatuses according to the invention, it is more preferable that the gradient direction calculating section includes:

a gradient value calculating section that calculates each gradient value on the basis of a difference between a characteristic amount of the current evaluation pixel and a characteristic amount of each of a plurality of gradient calculation pixels which circumferentially surround the current evaluation pixel;

a smoothing process section that generates a smoothing gradient value group by applying a smoothing process to a gradient value group in which the gradient values each corresponding to each of the plurality of gradient calculation pixels are arranged in an order in which the plurality of gradient calculation pixels circumferentially surround the current evaluation pixel; and a gradient direction determining section that determines as the gradient direction a direction in which the current evaluation pixel and the gradient calculation pixel corresponding to the maximum smoothing gradient value in the smoothing gradient value group among the plurality of gradient calculation pixels which circumferentially surround the current evaluation pixel.

According to this preferred aspect, since the smoothing process is applied to the gradient value group by the smoothing process section, an influence due to erroneous detection can be suppressed, and the gradient direction can be easily calculated.

In addition, in a similar semicircle detecting apparatus which is provided with the smoothing process section described above of the similar semicircle detecting apparatuses according to the invention, it is preferable that the smoothing process section includes a high value suppressing process section that replaces the gradient value exceeding a predetermined threshold value among the individual gradient values constituting the gradient value group with the predetermined threshold value.

In addition, in a similar semicircle detecting apparatus which is provided with the smoothing process section described above of the similar semicircle detecting apparatuses according to the invention, it is preferable that the smoothing process section applies a moving average process of suppressing a noise to the gradient value group.

In addition, in a similar semicircle detecting apparatus which is provided with the smoothing process section described above of the similar semicircle detecting apparatuses according to the invention, it is preferable that the smoothing process section includes a quantizing process section that replaces each of the gradient values constituting the gradient value group by any one of the plural gradient values that have values approximated to the gradient values and are discretely set, and generates a new gradient value group.

In addition, in a similar semicircle detecting apparatus which is provided with the smoothing process section described above of the similar semicircle detecting apparatuses according to the invention, it is preferable that the smoothing process section applies a moving average process of developing a gradient value having a unique maximum value in the gradient value group.

Further, in a similar semicircle detecting apparatus which is provided with the smoothing process section described above of the similar semicircle detecting apparatuses according to the invention, it is preferable that the pixel evaluation value calculating section includes:

a table storage section that stores a table common to a plurality of pixels in interest and a plurality of evaluation pixels in which table both of a first value which indicates a direction of the evaluation pixel when viewed from the pixel in interest and a second value which indicates the gradient direction of the evaluation pixel and the pixel evaluation value of the current evaluation pixel are associated with each other; and a table referring section that calculates a pixel evaluation value of the current evaluation pixel from the table based on the specific first value which indicates the direction of the evaluation pixel when the specific evaluation pixel is viewed from the specific pixel in interest and the specific second value that indicates the gradient direction of the current evaluation pixel.

According to this preferred aspect, since the table is stored in the table storage section, a calculation process becomes unnecessary when the pixel evaluation value is actually calculated. Since the pixel evaluation value can be calculated by referring to the table, a high speed process is obtained.

According to the invention, a computer-readable storage medium stores a similar semicircle detecting program that is executed in a computer and causes the computer to operate as a similar semicircle detecting apparatus which detects a similar semicircular shape similar to a semicircular shape from an image represented by pixels arranged two-dimensionally, the similar semicircle detecting apparatus including:

a first evaluation value calculating section that calculates a pixel evaluation value to evaluate whether a current evaluation pixel is a pixel on a circular arc in which the predetermined pixel in interest is centered, for each of a plurality of evaluation pixels which are arranged along a circle in which a predetermined pixel in interest is centered and surround the predetermined pixel in interest;

a second evaluation value calculating section that performs a process of integrating plural pixel evaluation values corresponding to the plurality of evaluation pixels on the circular arc overlapping the circle so as to calculate an integrated evaluation value to evaluate whether the circular arc is a circular arc corresponding to a similar semicircular shape, for each of a plurality of circular arcs which overlap the circle in overlapping phases which are different from each other; and a circular arc extracting section that compares a plurality of integrated evaluation values corresponding to the plural circular arcs, and extracts the circular arc with which the integrated evaluation value indicating the most approximation to the similar semicircular shape is associated, from the plural circular arcs.

According to the similar semicircle detecting program according to one aspect of the present invention, when the similar semicircle detecting program is installed in the computer and operates the computer, the similar semicircle detecting program causes the computer to operate as the similar semicircle detecting apparatus according to one aspect of the present invention. All aspects that correspond to the various functions of the similar semicircle detecting apparatus are included in the similar semicircle detecting program.

Further, in the constituent elements, such as the first evaluation value calculating section, which constitute the similar semicircle detecting program according to one aspect of the present invention, a function of one constituent element may be executed by one program component, the function of one constituent element may be executed by plural program components, or functions of the plural constituent elements may be executed by one program component. In addition, the constituent elements may by themselves execute the functions without depending on other programs or program components or may execute the functions in accordance with an instruction from other programs or program components that are incorporated in the computer.

Further, in the similar semicircle detecting apparatus and the similar semicircle detecting program according to one aspect of the present invention, the same names are given to the individual constituent elements. However, these constituent elements mean hardware and software in the similar semicircle detecting apparatus but means only software in the similar semicircle detecting program.

According to the aspects of the present invention, a similar semicircle detecting apparatus that can detect a similar semicircle shape similar to a semicircular shape from an image represented by pixels that are two-dimensionally arranged and obtain a slope of the detected similar semicircular shape, and a computer-readable storage medium storing a similar semicircle detecting program that causes a computer to operate as the similar semicircle detecting apparatus are provided.

BRIEF DESCRIPTION OF THE DRAWINGS

FIG. 15 is a diagram illustrating an example of a table that is stored in a table storage section.

DETAILED DESCRIPTION

Hereinafter, preferred embodiments of the present invention will be described in detail with reference to the appended drawings.

Figure 1:
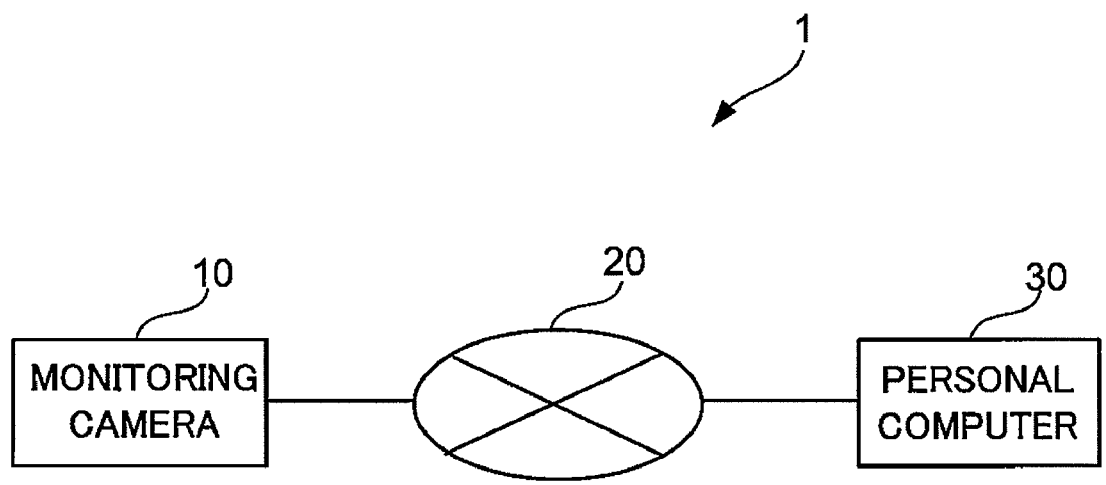
FIG. 1 is a diagram illustrating the schematic configuration of a monitoring camera system where a similar semicircle detecting apparatus according to an embodiment of the present invention is incorporated.

FIG. 1 is a diagram illustrating the schematic configuration of a monitoring camera system 1 where a similar semicircle detecting apparatus according to an embodiment of the present invention is incorporated.

In FIG. 1 that shows the schematic configuration diagram of the monitoring camera system 1, a monitoring camera 10, the Internet 20, and a personal computer 30 are shown.

The monitoring camera 10 is disposed in a bank and photographs a state in a bank. Further, the monitoring camera 10 is connected to the Internet 20 and transmits image data representing a moving picture to the personal computer 30 through network communication. The monitoring camera 10 that is shown by one block in FIG. 1 may be one monitoring camera, and here indicate plural monitoring cameras.

The personal computer 30 is connected to the Internet 20, and receives the image data that is transmitted from the monitoring camera 10 through network communication. Further, the personal computer 30 collectively manages moving pictures that are photographed by the monitoring camera 10. Here, an outline of an upper portion of a head portion of a person has a similar semicircular shape that is similar to a semicircular shape. In addition, the personal computer 30 is an embodiment of the similar semicircle detecting apparatus according to the embodiment of the present invention, and has a function of detecting a similar semicircle shape in an angle of view to detect a head portion of a person who has the similar semicircle shape.

Here, since the monitoring camera 10 is not a subject matter of the present invention, a detailed explanation thereof will be omitted here. Hereinafter, a description is given to the personal computer 30 that operates as the embodiment of the similar semicircle detecting apparatus according to the present invention to detect a head portion of a person.

Figure 2:
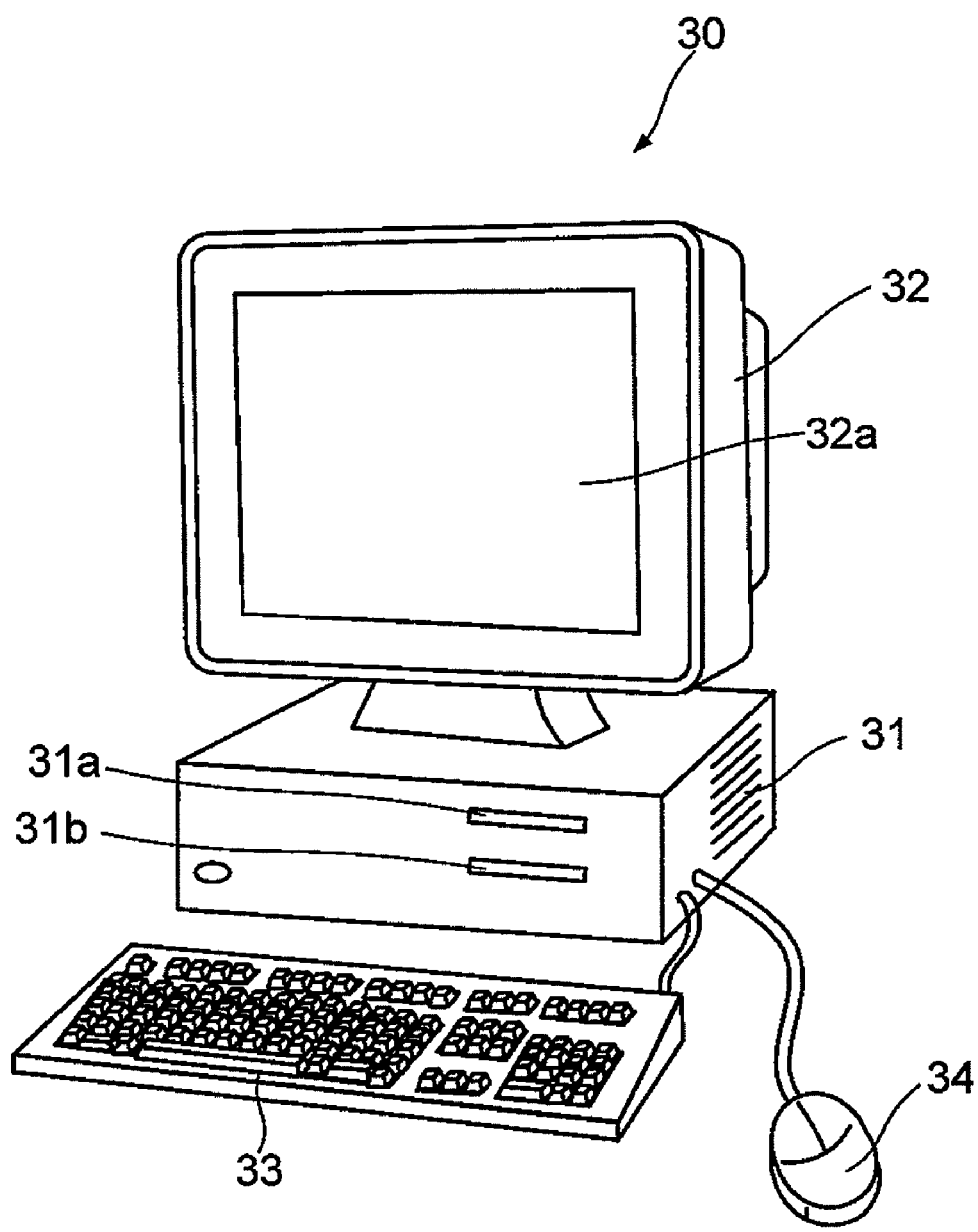
FIG. 2 is a perspective view illustrating an external appearance of a personal computer that is shown by one block in FIG. 1.
Figure 3:
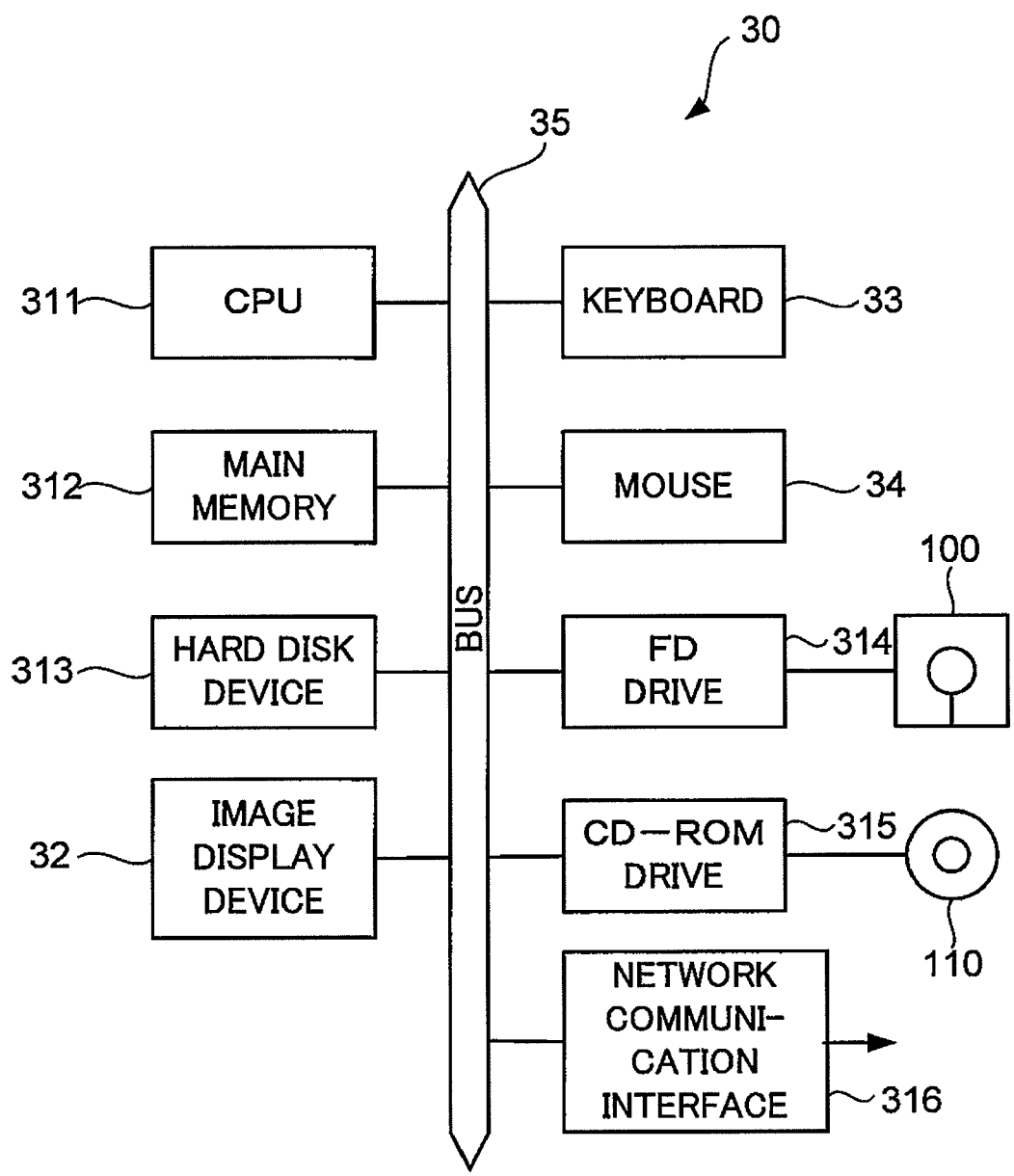
FIG. 3 is a diagram illustrating the hardware configuration of the personal computer shown in FIGS. 1 and 2.

FIG. 2 is a perspective view illustrating an external appearance of a personal computer 30 that is shown by one block in FIG. 1. FIG. 3 is a diagram illustrating the hardware configuration of a personal computer 30.

Here, the similar semicircle detecting apparatus according to the embodiment of the present invention is configured by an OS (Operation System) and hardware of the personal computer 30 and a similar semicircle detecting program that is installed and executed in the personal computer 30.

As an external appearance of configuration, the personal computer 30 includes a main body 31, an image display device 32 that displays an image on a display screen 32a in accordance with an instruction from the main body 31, a keyboard 33 through which a variety of information according to key operations to the main body 31 is input, and a mouse 34 by which an arbitrary location on the display screen 32a is designated to input, for example, an instruction according to an icon and the like displayed at the designated location at the time of designating the location. The main body 31 has an FD loading slot 31a for loading a flexible disk (FD), and a CD-ROM loading slot 31b for loading a CD-ROM.

As shown in FIG. 3, in the main body 31, a CPU 311 that executes various programs, a main memory 312 where programs stored in a hard disk device 313 are read and are developed to be executed by the CPU 311, the hard disk device 313 where the various programs or data is stored, an FD drive 314 that loads a FD 100 and has access to the loaded FD 100, a CD-ROM drive 315 that loads a CD-ROM 110 and has access to the loaded CD-ROM 110, and a network communication interface 316 that is connected to the Internet 20 shown in FIG. 1 and controls network communication with the monitoring camera 10 are incorporated. These elements and the image display device 32, the keyboard 33, and the mouse 34 shown in FIG. 2 are connected to each other through a bus 35.

Here, the CD-ROM 110 stores a similar semicircle detecting program that causes the personal computer 30 to operate as the similar semicircle detecting apparatus. The CD-ROM 110 is loaded on the CD-ROM drive 315, and the similar semicircle detecting program that is stored in the CD-ROM 110 is uploaded in the personal computer 30 and stored in the hard disk device 313.

First, the description will be given to an embodiment in which the similar semicircle detecting program that is stored in the CD-ROM 110 is uploaded in the personal computer 30 and stored in the hard disk device 313, and the personal computer 30 operates as the similar semicircle detecting apparatus.

Figure 4:
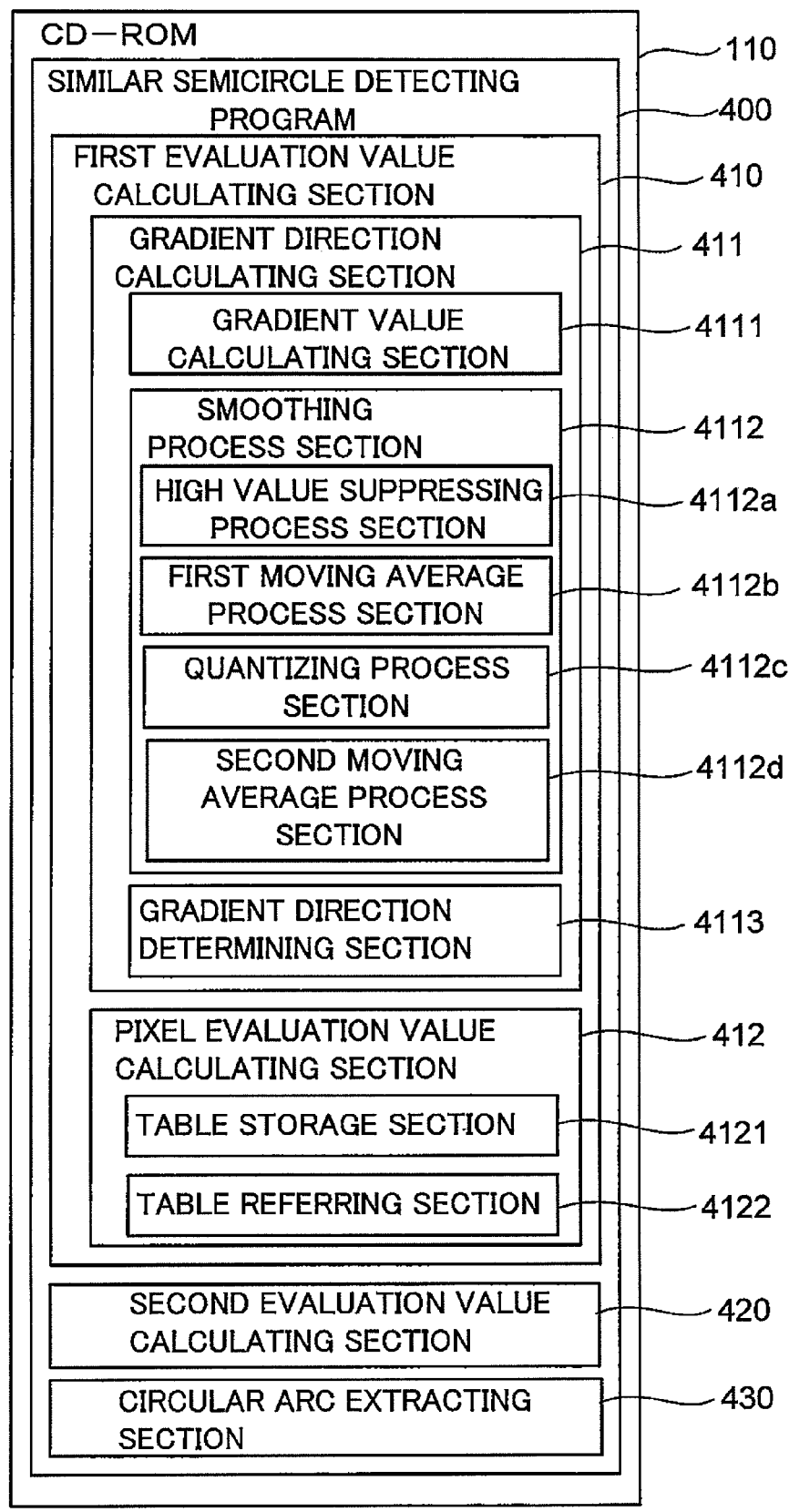
FIG. 4 is a diagram illustrating a computer-readable storage medium storing a similar semicircle detecting program according to an embodiment of the present invention.

FIG. 4 is a flowchart illustrating a storage medium that stores a similar semicircle detecting program according to an embodiment of the present invention.

The similar semicircle detecting program 400 that is shown in FIG. 4 is stored in the CD-ROM 110 that is shown in FIG. 3.

The similar semicircle detecting program 400 is executed in the personal computer 30 shown in FIGS. 1, 2, and 3, and causes the personal computer 30 to operate as the similar semicircle detecting apparatus according to the embodiment of the present invention that detects a similar semicircle shape similar to a semicircular shape from an image represented by pixels that are two-dimensionally arranged. The similar semicircle detecting program 400 includes a first evaluation value calculating section 410, a second evaluation value calculating section 420, and a circular arc extracting section 430. Further, the first evaluation value calculating section 410 includes a gradient direction calculating section 411 and a pixel evaluation value calculating section 412. The gradient direction calculating section 411 of the first evaluation value calculating section 410 includes a gradient value calculating section 4111, a smoothing process section 4112, and a gradient direction determining section 4113. The smoothing process section 4112 of the gradient direction calculating section 411 includes a high value suppressing process section 4112a, a first moving average process section 4112b, a quantizing process section 4112c, and a second moving average process section 4112d. Further, the pixel evaluation value calculating section 412 of the first evaluation value calculating section 410 includes a table storage section 4121 and a table referring section 4122.

The functions and operations of the individual elements of the similar semicircle detecting program 400 will be described below.

Figure 5:
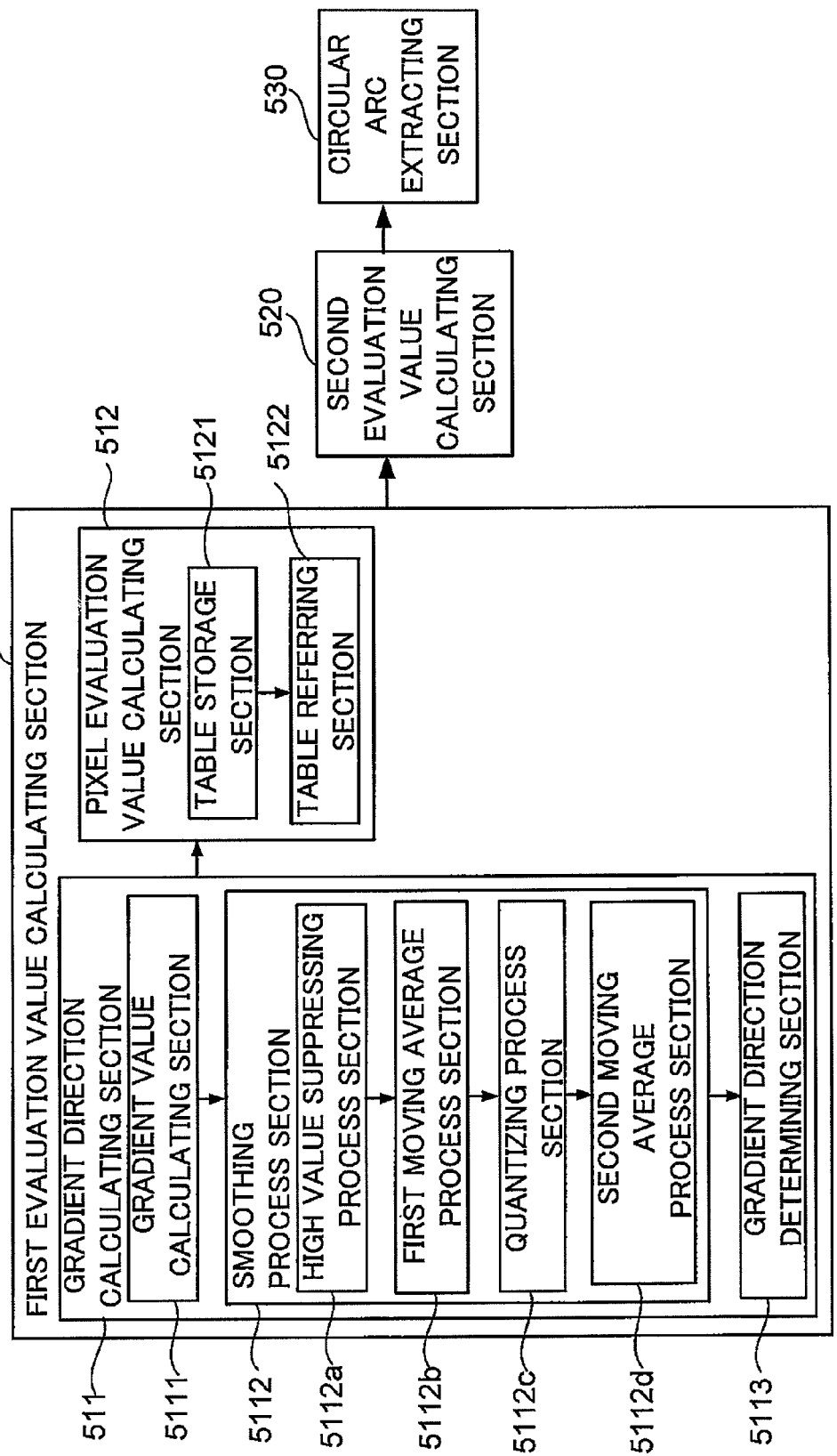
FIG. 5 is a functional block diagram illustrating a similar semicircle detecting apparatus according to an embodiment of the present invention.

FIG. 5 is a functional block diagram illustrating a similar semicircle detecting apparatus according to an embodiment of the present invention.

The similar semicircle detecting program 400 shown in FIG. 4 is loaded in the personal computer 30 shown in FIGS. 1, 2, and 3 and the similar semicircle detecting program 400 is executed in the personal computer 30 so that the similar semicircle detecting apparatus 500 shown in FIG. 5 is obtained.

The similar semicircle detecting apparatus 500 shown in FIG. 5 detects a similar semicircle shape similar to a semicircular shape from an image represented by pixels that are two-dimensionally arranged. The similar semicircle detecting apparatus 500 includes a first evaluation value calculating section 510, a second evaluation value calculating section 520, and a circular arc extracting section 530. Further, the first evaluation value calculating section 510 includes a gradient direction calculating section 511 and a pixel evaluation value calculating section 512. The gradient direction calculating section 511 of the first evaluation value calculating section 510 includes a gradient value calculating section 5111, a smoothing process section 5112, and a gradient direction determining section 5113. The smoothing process section 5112 of the gradient direction calculating section 511 includes a high value suppressing process section 5112a, a first moving average process section 5112b, a quantizing process section 5112c, and a second moving average process section 5112d. Further, the pixel evaluation value calculating section 512 of the first evaluation value calculating section 510 includes a table storage section 5121 and a table referring section 5122.

The individual elements of the first evaluation value calculating section 510, the gradient direction calculating section 511, the gradient value calculating section 5111, the smoothing process section 5112, the high value suppressing process section 5112a, the first moving average process section 5112b, the quantizing process section 5112c, the second moving average process section 5112d, the gradient direction determining section 5113, the pixel evaluation value calculating section 512, the table storage section 5121, the table referring section 5122, the second evaluation value calculating section 520, and the circular arc extracting section 530 that are included in the similar semicircle detecting apparatus 500 are configured by combinations of the respective elements of the first evaluation value calculating section 410, the gradient direction calculating section 411, the gradient value calculating section 4111, the smoothing process section 4112, the high value suppressing process section 4112a, the first moving average process section 4112b, the quantizing process section 4112c, the second moving average process section 4112d, the gradient direction determining section 4113, the pixel evaluation value calculating section 412, the table storage section 4121, the table referring section 4122, the second evaluation value calculating section 420, and the circular arc extracting section 430, which function as the program components constituting the similar semicircle detecting program 400 shown in FIG. 4, and hardware and an OS (Operation System) or an application program of the personal computer 30 shown in FIGS. 1, 2, and 3, which is needed to realize the individual functions of the software components.

Hereinafter, as the description of the individual elements of the similar semicircle detecting apparatus 500 shown in FIG. 5, the description of the individual elements of the similar semicircle detecting program 400 shown in FIG. 4 are conventionally explained.

Here, the conceptual functions and operations of the individual elements of the similar semicircle detecting apparatus 500 will be described and the specific functions and operations of the individual elements will be described later.

The first evaluation value calculating section 510 of the similar semicircle detecting apparatus 500 shown in FIG. 5 is an element that corresponds to the first evaluation value calculating section 410 of the similar semicircle detecting program 400 shown in FIG. 4 in terms of the application software, and calculates a pixel evaluation value to evaluate whether a current evaluation pixel of plural evaluation pixels is a pixel on a semicircle of 180° in which a pixel in interest is centered, for each of the plural evaluation pixels that are arranged along a circle in which the pixel in interest is centered and surround the pixel in interest. The first evaluation value calculating section 510 represents an example of the function of the first evaluation value calculating section according to the invention, and the corresponding function is mainly obtained by the CPU 311 that is incorporated in the main body 31 of the personal computer 30 shown in FIGS. 1, 2, and 3 and executes the first evaluation value calculating section 410 (refer to FIG. 4) functioning as the program component.

Even in the individual elements of the similar semicircle detecting apparatus 500 that is described below, the functions of the individual elements are mainly obtained by the CPU 311 that is incorporated in the main body 31 of the personal computer 30 shown in FIGS. 1, 2, and 3. Accordingly, in order to avoid repetitive descriptions, the explanation of the individual elements in terms of hardware configuration will be omitted.

In addition, the gradient direction calculating section 511 that is included in the first evaluation value calculating section 510 is an element that corresponds to the gradient direction calculating section 411 of the similar semicircle detecting program 400 shown in FIG. 4 in terms of the application software, and calculates a gradient direction where a luminance value on an image varies, for each of the plural evaluation pixels. The gradient direction calculating section 511 represents an example of the function of the gradient direction calculating section according to the invention.

In addition, the gradient value calculating section 5111 that is included in the gradient direction calculating section 511 of the first evaluation value calculating section 510 is an element that corresponds to the gradient value calculating section 4111 of the similar semicircle detecting program 400 shown in FIG. 4 in terms of the application software, and calculates each gradient value on the basis of a difference between a luminance value of the current evaluation pixel and a luminance value of each of the plural gradient calculation pixels that circumferentially surround the current evaluation pixel. The gradient direction calculating section 511 represents an example of the function of the gradient direction calculating section according to the invention.

In addition, the smoothing process section 5112 that is included in the gradient direction calculating section 511 of the first evaluation value calculating section 510 is an element that corresponds to the smoothing process section 4112 of the similar semicircle detecting program 400 shown in FIG. 4 in terms of the application software, and generates a group of smoothing gradient values by applying a smoothing process to the group of gradient values corresponding to the plural gradient calculation pixels when the plural gradient calculation pixels are arranged in the order of circumferentially surrounding the evaluation pixel. The smoothing process section 5112 represents an example of the function of the smoothing process section according to the invention.

In addition, the high value suppressing process section 5112a that is included in the smoothing process section 5112 of the gradient direction calculating section 511 is an element that corresponds to the high value suppressing process section 4112a of the similar semicircle detecting program 400 shown in FIG. 4 in terms of the application software, and replaces the gradient value exceeding a predetermined threshold value among the gradient values constituting the group of gradient values with the threshold value. The high value suppressing process section 5112a represents an example of the function of the smoothing process section according to the invention.

In addition, the first moving average process section 5112b that is included in the smoothing process section 5112 of the gradient direction calculating section 511 is an element that corresponds to the first moving average process section 4112b of the similar semicircle detecting program 400 shown in FIG. 4 in terms of the application software, and applies a moving average process of suppressing a noise on the group of gradient values. The first moving average process section 5112b represents an example of the function of the smoothing process section according to the invention.

In addition, the quantizing process section 5112c that is included in the smoothing process section 5112 of the gradient direction calculating section 511 is an element that corresponds to the quantizing process section 4112c of the similar semicircle detecting program 400 shown in FIG. 4 in terms of the application software, and generates a new group of gradient values by replacing each of the gradient values constituting the group of gradient values with a gradient value that has an approximate value to each of the gradient values of plural gradient values that are discretely set. The quantizing process section 5112c represents an example of the function of the smoothing process section according to the invention.

In addition, the second moving average process section 5112d that is included in the smoothing process section 5112 of the gradient direction calculating section 511 is an element that corresponds to the second moving average process section 4112d of the similar semicircle detecting program 400 shown in FIG. 4 in terms of the application software, and applies a moving average process of developing a gradient value having a unique maximum value on the group of gradient values. The second moving average process section 5112d represents an example of the function of the smoothing process section according to the invention.

In addition, the gradient direction determining section 5113 that is included in the gradient direction calculating section 511 of the first evaluation value calculating section 510 is an element that corresponds to the gradient direction determining section 4113 of the similar semicircle detecting program 400 shown in FIG. 4 in terms of the application software, and determines as the gradient direction a direction in which the current evaluation pixel and the gradient calculation pixel corresponding to the maximum gradient value in the group of smoothing gradient values among the plural gradient calculation pixels that circumferentially surround the current evaluation pixel. The gradient direction determining section 5113 represents an example of the function of the gradient direction determining section according to the invention.

In addition, the pixel evaluation value calculating section 512 that is included in the first evaluation value calculating section 510 is an element that corresponds to the pixel evaluation value calculating section 412 of the similar semicircle detecting program 400 shown in FIG. 4 in terms of the application software, and calculates the pixel evaluation value based on an angle that is formed by a direction in which the current evaluation pixel and the pixel in interest are connected and the gradient direction calculated by the gradient direction calculating section, for each of the plural evaluation pixels. The pixel evaluation value calculating section 512 shows an example of the function of the pixel evaluation value calculating section according to the invention.

In addition, the table storage section 5121 that is included in the pixel evaluation value calculating section 512 of the first evaluation value calculating section 510 is an element that corresponds to the table storage section 4121 of the similar semicircle detecting program 400 shown in FIG. 4 in terms of the application software, and stores a table common to the plural pixels in interest and the plural evaluation pixels in which table both of a first value representing a direction of each of the evaluation pixels viewed from the pixel in interest and a second value representing a gradient direction of each of the evaluation pixels and a pixel evaluation value of each of the evaluation pixels are associated with each other. The table storage section 5121 represents an example of the function of the table storage section according to the invention.

In addition, the table referring section 5122 that is included in the pixel evaluation value calculating section 512 of the first evaluation value calculating section 510 is an element that corresponds to the table referring section 4122 of the similar semicircle detecting program 400 shown in FIG. 4 in terms of the application software, and calculates a pixel evaluation value of the current evaluation pixel from the table, based on both of a specific first value that indicates a direction of a current evaluation pixel when a specific evaluation pixel is viewed from the specific pixel in interest and the specific second value that indicates the gradient direction of the evaluation pixel. The table referring section 5122 shows an example of the function of the table referring section according to the invention.

In addition, the second evaluation value calculating section 520 is an element that corresponds to the second evaluation value calculating section 420 of the similar semicircle detecting program 400 shown in FIG. 4 in terms of the application software, and performs a process of integrating plural pixel evaluation values corresponding to the plural evaluation pixels on a semicircle of 180° overlapping the circle and calculating an integrated evaluation value to evaluate whether the semicircle of 180° is a semicircle of 180° corresponding to a similar semicircular shape, for each of plural semicircles of 180° that overlap the circle and have phases different from each other. The second evaluation value calculating section 520 shows an example of the function of the second evaluation value calculating section according to the invention.

In addition, the circular arc extracting section 530 is an element that corresponds to the circular arc extracting section 430 of the similar semicircle detecting program 400 shown in FIG. 4 in terms of the application software, compares the plural integrated evaluation values that correspond to the plural semicircles of 180°, and extracts the semicircle of 180° with which the integrated evaluation value indicating the most approximation to the similar semicircular shape is associated, from among the plural semicircles of 180°. The circular arc extracting section 530 represents an example of the function of the circular arc extracting section according to the invention.

Hereinafter, the similar semicircle detecting apparatus according to the embodiment of the present invention will be specifically described.

Figure 6:
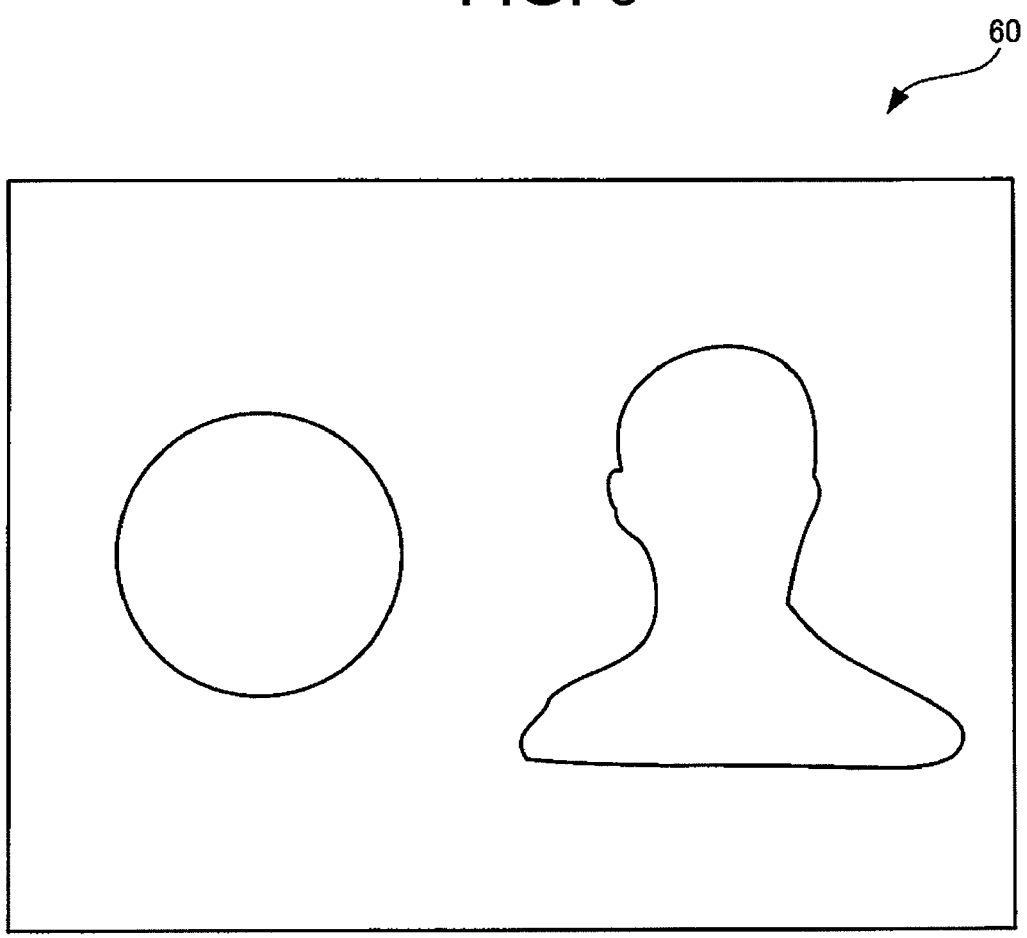
FIG. 6 is a diagram illustrating an example of an image represented by pixels that are two-dimensionally arranged.

FIG. 6 is a diagram illustrating an example of an image represented by pixels that are two-dimensionally arranged.

The image 60 that is shown in FIG. 6 is an image that indicates one frame of a moving picture represented by image data, which is photographed by the monitoring camera 10 connected to the Internet 20 and transmitted from the monitoring camera 10 to the personal computer 30 through network communication. In addition, the image 60 is an image represented by pixels that are two-dimensionally arranged.

Figure 7:
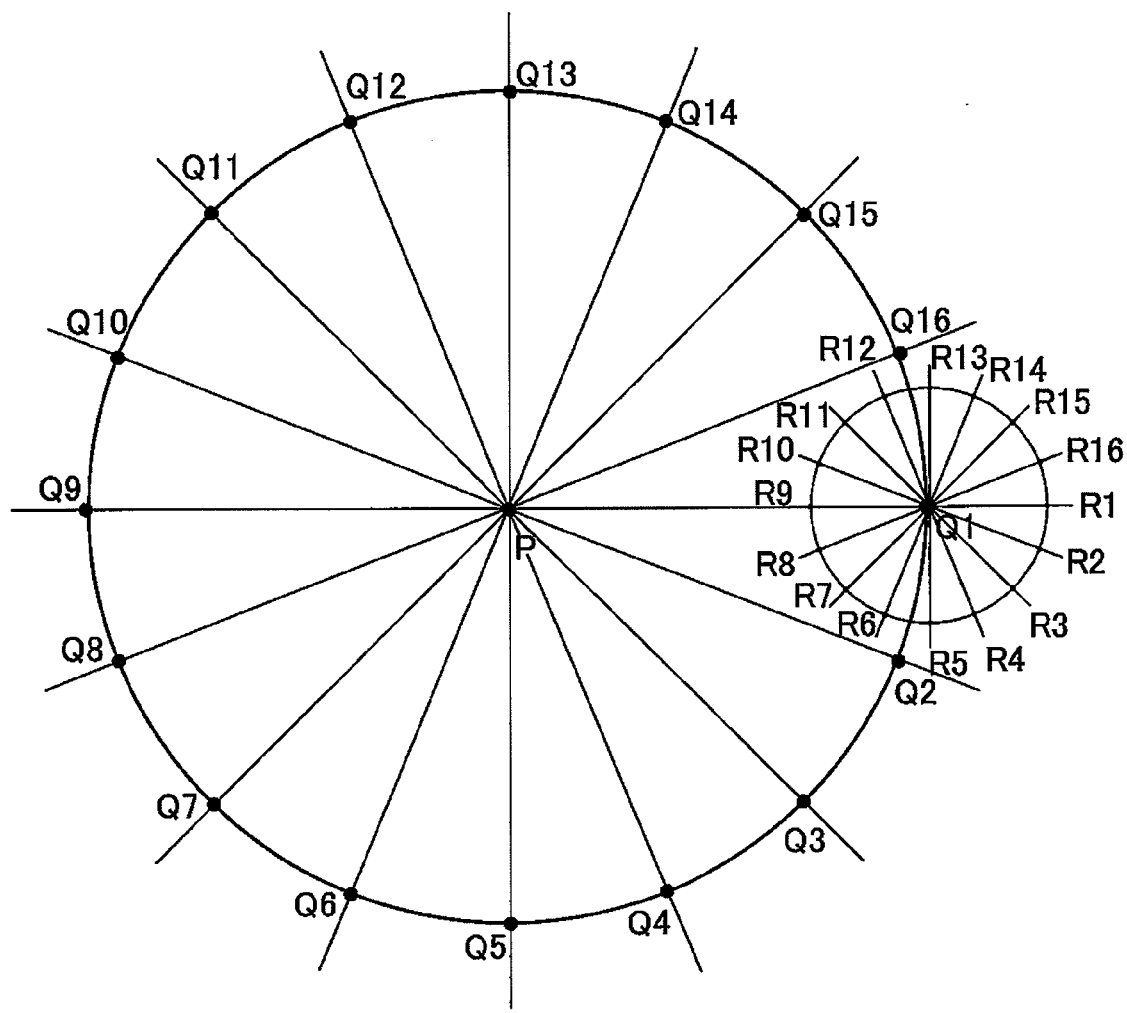
FIG. 7 is a conceptual diagram illustrating a pixel in interest P, evaluation pixels Q1 to Q16, and gradient calculation pixels R1 to R16 among plural pixels that represent an image shown in FIG. 6.

FIG. 7 is a conceptual diagram illustrating a pixel in interest P, evaluation pixels Q1 to Q16, and gradient calculation pixels R1 to R16 among plural pixels that represent the image 60 shown in FIG. 6.

FIG. 7 shows the pixel in interest P that is one pixel among the plural pixels representing the image 60 shown in FIG. 6, and the 16 evaluation pixels Q1 to Q16 that are arranged along the circle in which the pixel in interest P is centered at same spacing and surround the pixel in interest P. In addition, FIG. 7 shows the 16 gradient calculation pixels R1 to R16 that are arranged along the circle in which one evaluation pixel Q1 among the 16 evaluation pixels Q1 to Q16 is centered at same spacing and surround the evaluation pixel Q1.

First, when the first evaluation value calculating section 510 calculates a pixel evaluation value to evaluate whether each of the evaluation pixels over an entire area of the image 60 shown in FIG. 6 is a pixel on a semicircle of 180° in which a predetermined pixel in interest is centered for each of the evaluation pixels, the gradient direction calculating section 511 that is included in the first evaluation value calculating section 510 calculates a gradient direction where a luminance value on the image 60 varies, for each of the evaluation pixels Q1 to Q16. In addition, with respect to the evaluation pixels that are arranged along the circle in which the pixel in interest P is centered in a radius different from that of the circle shown in FIG. 7 and surround the pixel in interest P or the evaluation pixels that surround the pixel in interest when one pixel among the plural pixels that represent the image 60 shown in FIG. 6 and have different locations from the location of the pixel in interest P shown in FIG. 7 is set as the pixel in interest, the gradient direction calculating section 511 calculates a gradient direction where a luminance value on the image 60 varies, for each of the evaluation pixels. In this way, the gradient direction calculating section 511 calculates a gradient direction for each of the evaluation pixels over the entire area of the image 60 shown in FIG. 6. Here, calculation of a gradient direction for one evaluation pixel Q1 will be described among the 16 evaluation pixels Q1 to Q16 that are arranged along the circle in which the pixel in interest P shown in FIG. 7 is centered and surround the pixel in interest P.

The gradient value calculating section 5111 that is included in the gradient direction calculating section 511 of the first evaluation value calculating section 510 calculates each gradient value on the basis of a difference between a luminance value of the evaluation pixel Q1 and a luminance value of each of the 16 gradient calculation pixels R1 to R16 that circumferentially surround the evaluation pixel Q1.

Figure 8:
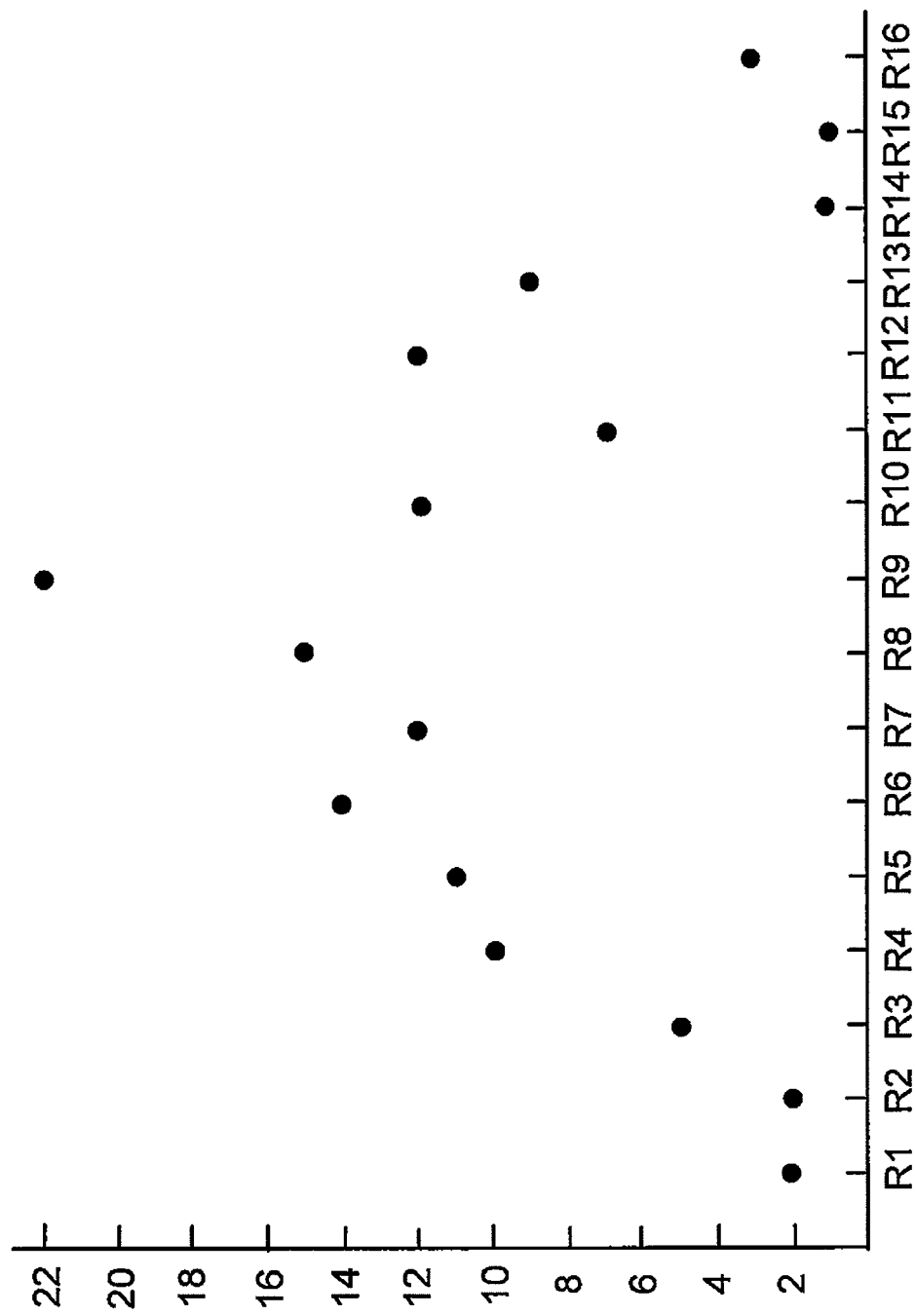
FIG. 8 is a diagram illustrating a group of gradient values corresponding to 16 gradient calculation pixels R1 to R16 when the 16 gradient calculation pixels R1 to R16 are arranged in the order in which the 16 gradient calculation pixels R1 to R16 circumferentially surround the evaluation pixel Q1.

FIG. 8 shows a gradient value group of the gradient values corresponding to the 16 gradient calculation pixels R1 to R16 when the 16 gradient calculation pixels R1 to R16 are arranged in the order of circumferentially surrounding the evaluation pixel Q1. The horizontal axis indicates the gradient calculation pixels R1 to R16 and the vertical axis indicates the gradient values.

As shown in FIG. 8, in regards to the gradient values that are calculated by the gradient value calculating section 5111 and constitute the gradient value group, a gradient value that corresponds to the gradient calculation pixel R1 is "2.0", a gradient value that corresponds to the gradient calculation pixel R2 is "2.0", a gradient value that corresponds to the gradient calculation pixel R3 is "5.0", a gradient value that corresponds to the gradient calculation pixel R4 is "10.0", a gradient value that corresponds to the gradient calculation pixel R5 is "11.0", a gradient value that corresponds to the gradient calculation pixel R6 is "14.0", a gradient value that corresponds to the gradient calculation pixel R7 is "12.0", a gradient value that corresponds to the gradient calculation pixel R8 is "15.0", a gradient value that corresponds to the gradient calculation pixel R9 is "22.0", a gradient value that corresponds to the gradient calculation pixel R10 is "12.0", a gradient value that corresponds to the gradient calculation pixel R11 is "7.0", a gradient value that corresponds to the gradient calculation pixel R12 is "12.0", a gradient value that corresponds to the gradient calculation pixel R13 is "9.0", a gradient value that corresponds to the gradient calculation pixel R14 is "1.0", a gradient value that corresponds to the gradient calculation pixel R15 is "1.0", and a gradient value that corresponds to the gradient calculation pixel R16 is "3.0."

Here, in order to remove a noise of each of the gradient values that are calculated by the gradient value calculating section 5111, the smoothing process section 5112 that is included in the gradient direction calculating section 511 of the first evaluation value calculating section 510 generates a smoothing gradient value group by applying a smoothing process to the gradient value group shown in FIG. 8.

In this embodiment, as the smoothing process, a high value suppressing process, a first moving average process, a quantizing process, and a second moving average process are sequentially executed.

Figure 9:
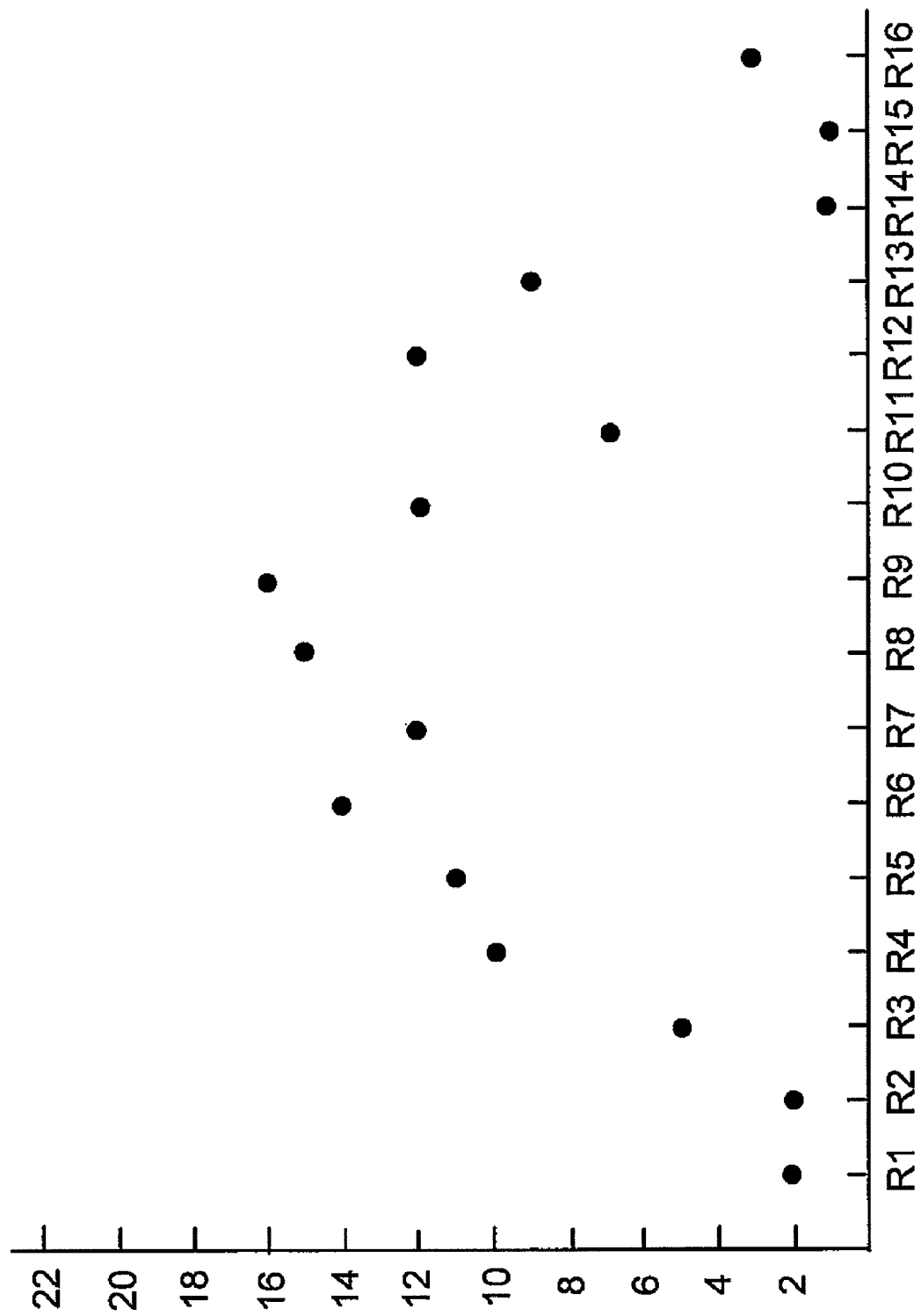
FIG. 9 is a diagram illustrating a group of smoothing gradient values that are generated by applying a high value suppressing process on the gradient value group shown in FIG. 8.

FIG. 9 is a diagram illustrating a smoothing gradient value group that is generated by applying a high value suppressing process on the gradient value group shown in FIG. 8. The horizontal axis indicates the gradient calculation pixels R1 to R16 and the vertical axis indicates the gradient values.

In the embodiment, as a threshold value of the gradient values that is used when the high value suppressing process is applied, a threshold value "16.0" is set. The high value suppressing process section 5112a that is included in the smoothing process section 5112 replaces any of the gradient values that exceeds the value "16.0" set as the threshold value of the individual gradient values that constitute the gradient value group shown in FIG. 8 by the threshold value "16.0", thereby generating a new smoothing gradient value group. Here, since the gradient value that corresponds to the gradient calculation pixel R9 is a gradient value that exceeds the threshold value "16.0", the gradient value "22.0" that corresponds to the gradient calculation pixel R9 is replaced by the smoothing gradient value "16.0". As shown in FIG. 9, in regards to the individual smoothing gradient values that constitute the smoothing gradient value group generated by the high value suppressing process section 5112a, a smoothing gradient value that corresponds to the gradient calculation pixel R1 is "2.0", a smoothing gradient value that corresponds to the gradient calculation pixel R2 is "2.0", a smoothing gradient value that corresponds to the gradient calculation pixel R3 is "5.0", a smoothing gradient value that corresponds to the gradient calculation pixel R4 is "10.0", a smoothing gradient value that corresponds to the gradient calculation pixel R5 is "11.0", a smoothing gradient value that corresponds to the gradient calculation pixel R6 is "14.0", a smoothing gradient value that corresponds to the gradient calculation pixel R7 is "12.0", a smoothing gradient value that corresponds to the gradient calculation pixel R8 is "15.0", a smoothing gradient value that corresponds to the gradient calculation pixel R9 is "16.0", a smoothing gradient value that corresponds to the gradient calculation pixel R10 is "12.0", a smoothing gradient value that corresponds to the gradient calculation pixel R11 is "7.0", a smoothing gradient value that corresponds to the gradient calculation pixel R12 is "12.0", a smoothing gradient value that corresponds to the gradient calculation pixel R13 is "9.0", a smoothing gradient value that corresponds to the gradient calculation pixel R14 is "1.0", a smoothing gradient value that corresponds to the gradient calculation pixel R15 is "1.0", and a smoothing gradient value that corresponds to the gradient calculation pixel R16 is "3.0".

Figure 10:
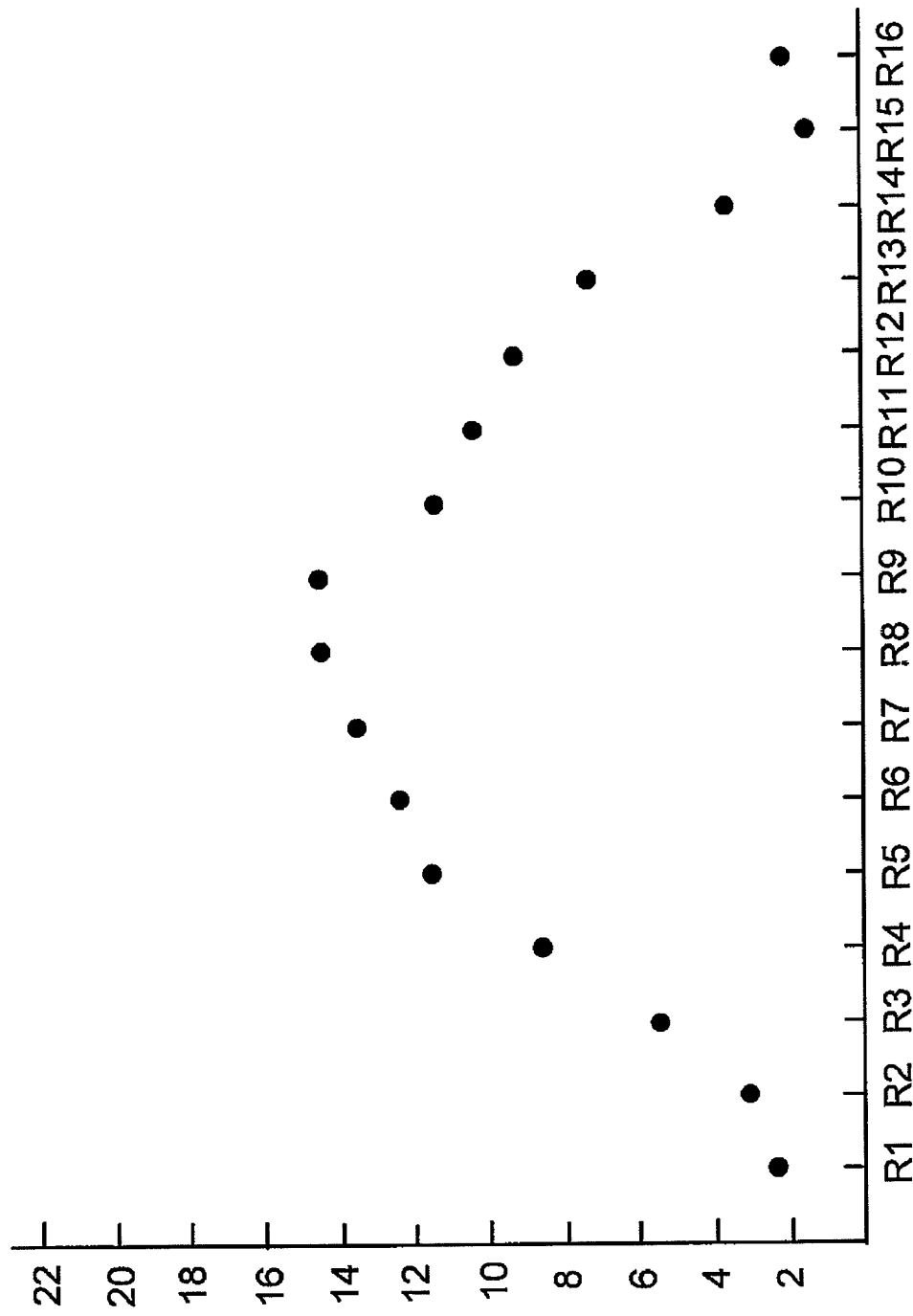
FIG. 10 is a diagram illustrating a smoothing gradient value group that is generated by applying a first moving average process on the smoothing gradient value group shown in FIG. 9.

FIG. 10 is a diagram illustrating a smoothing gradient value group that is generated by applying a first moving average process to a smoothing gradient value group shown in FIG. 9. The horizontal axis indicates the gradient calculation pixels R1 to R16 and the vertical axis indicates the gradient values.

The first moving average process section 5112a that is included in the smoothing process section 5112 applies a moving average process of suppressing a noise to the smoothing gradient value group after the high value suppressing process is executed by the high value suppressing process section 5112a, thereby generating a new smoothing gradient value group. Here, with respect to the gradient calculation pixel on which the moving average process is to be applied, the three smoothing gradient values including one prior smoothing gradient value and one subsequent smoothing gradient value and the smoothing gradient value corresponding to the gradient calculation pixel are used to calculate an average of the three smoothing gradient values. As described above, since the smoothing process is a process that is applied to the gradient value group of the individual gradient values corresponding to the 16 gradient calculation pixels R1 to R16 when the 16 gradient calculation pixels R1 to R16 are arranged in the order of circumferentially surrounding the evaluation pixel Q1, one prior smoothing gradient value and one subsequent smoothing gradient value of the smoothing gradient value of the gradient calculation pixel R1 are smoothing gradient values that correspond to the gradient calculation pixel R16 and the gradient calculation pixel R2. In the same way, one prior smoothing gradient value and one subsequent smoothing gradient value of the smoothing gradient value of the gradient calculation pixel R16 are smoothing gradient values that correspond to the gradient calculation pixel R15 and the gradient calculation pixel R1. As shown in FIG. 10, in regards to the individual smoothing gradient values that constitute the smoothing gradient value group generated by the first moving average process section 5112b, a smoothing gradient value that corresponds to the gradient calculation pixel R1 is "2.3", a smoothing gradient value that corresponds to the gradient calculation pixel R2 is "3.0", a smoothing gradient value that corresponds to the gradient calculation pixel R3 is "5.7", a smoothing gradient value that corresponds to the gradient calculation pixel R4 is "8.7", a smoothing gradient value that corresponds to the gradient calculation pixel R5 is "11.7", a smoothing gradient value that corresponds to the gradient calculation pixel R6 is "12.3", a smoothing gradient value that corresponds to the gradient calculation pixel R7 is "13.7", a smoothing gradient value that corresponds to the gradient calculation pixel R8 is "14.3", a smoothing gradient value that corresponds to the gradient calculation pixel R9 is "14.3", a smoothing gradient value that corresponds to the gradient calculation pixel R10 is "11.7", a smoothing gradient value that corresponds to the gradient calculation pixel R11 is "10.3", a smoothing gradient value that corresponds to the gradient calculation pixel R12 is "9.3", a smoothing gradient value that corresponds to the gradient calculation pixel R13 is "7.3", a smoothing gradient value that corresponds to the gradient calculation pixel R14 is "3.7", a smoothing gradient value that corresponds to the gradient calculation pixel R15 is "1.7", and a smoothing gradient value that corresponds to the gradient calculation pixel R16 is "2.0".

Figure 11:
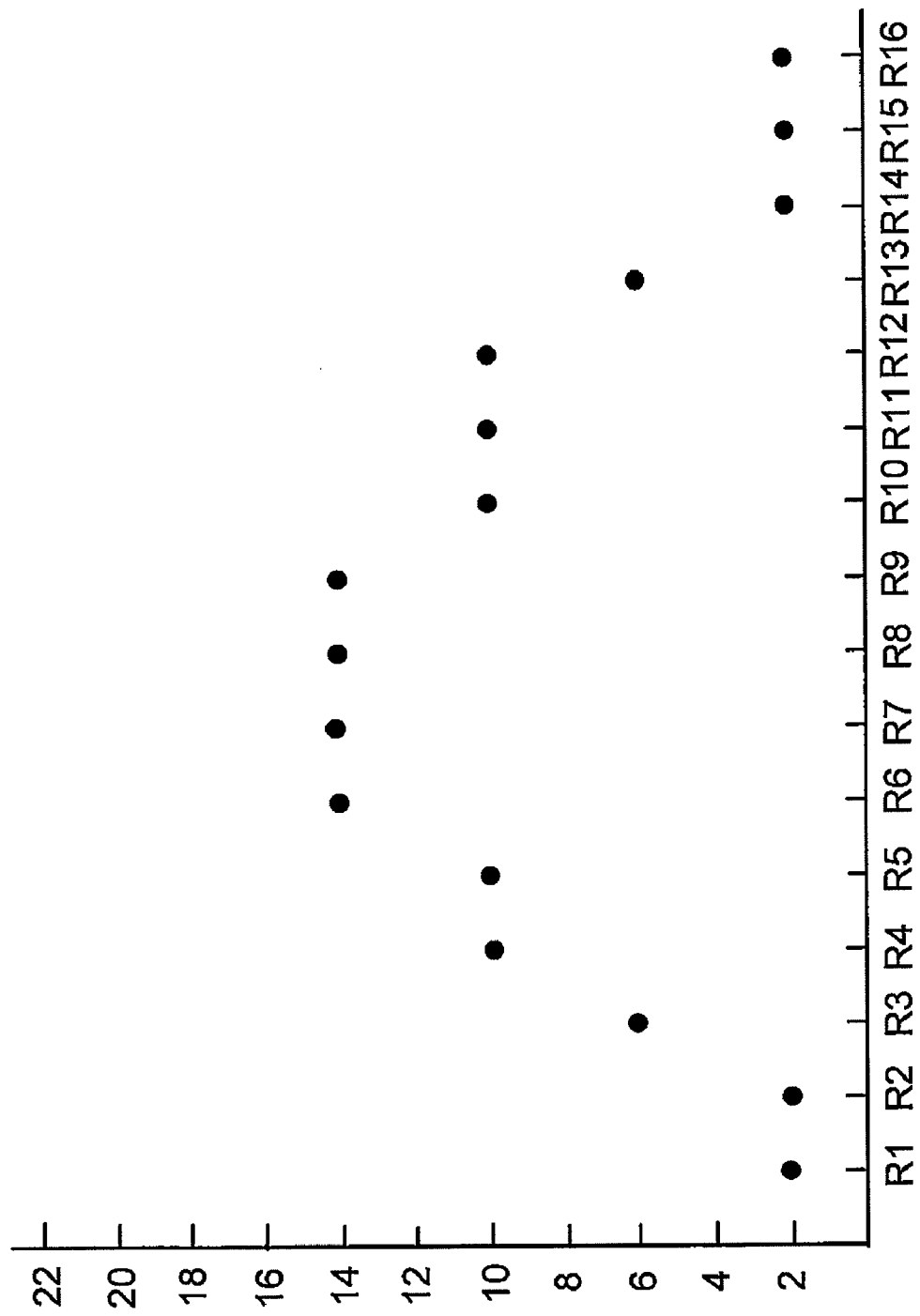
FIG. 11 is a diagram illustrating a smoothing gradient value group that is generated by applying a quantizing process on the smoothing gradient value group shown in FIG. 10.

FIG. 11 is a diagram illustrating a smoothing gradient value group that is generated by applying a quantizing process on a smoothing gradient value group shown in FIG. 10. The horizontal axis indicates the gradient calculation pixels R1 to R16 and the vertical axis indicates the gradient values.

The quantizing process section 5112c that is included in the smoothing process section 5112 replaces each of the smoothing gradient values constituting the smoothing gradient value group after the first moving average process is applied by the first moving average process section 5112b with a smoothing gradient value that has an approximate value to each of the smoothing gradient values of plural gradient values that are discretely set, thereby generating a new smoothing gradient value group. Here, when each of the smoothing gradient values constituting the smoothing gradient value group after the first moving average process is executed is larger than 0 and smaller than or equal to 4, each of the smoothing gradient values is replaced by "2". When each of the smoothing gradient values is larger than 4 and smaller than or equal to 8, each of the smoothing gradient values is replaced by "6". When each of the smoothing gradient values is larger than 8 and smaller than or equal to 12, each of the smoothing gradient values is replaced by "10". When each of the smoothing gradient values is larger than 12 and smaller than or equal to 16, each of the smoothing gradient values is replaced by "14". As shown in FIG. 11, in regards to the individual smoothing gradient values that constitute the smoothing gradient value group generated by the quantizing process section 5112c, a smoothing gradient value that corresponds to the gradient calculation pixel R1 is "2.0", a smoothing gradient value that corresponds to the gradient calculation pixel R2 is "2.0", a smoothing gradient value that corresponds to the gradient calculation pixel R3 is "6.0", a smoothing gradient value that corresponds to the gradient calculation pixel R4 is "10.0", a smoothing gradient value that corresponds to the gradient calculation pixel R5 is "10.0", a smoothing gradient value that corresponds to the gradient calculation pixel R6 is "14.0", a smoothing gradient value that corresponds to the gradient calculation pixel R7 is "14.0", a smoothing gradient value that corresponds to the gradient calculation pixel R8 is "14.0", a smoothing gradient value that corresponds to the gradient calculation pixel R9 is "14.0", a smoothing gradient value that corresponds to the gradient calculation pixel R10 is "10.0", a smoothing gradient value that corresponds to the gradient calculation pixel R11 is "10.0", a smoothing gradient value that corresponds to the gradient calculation pixel R12 is "10.0", a smoothing gradient value that corresponds to the gradient calculation pixel R13 is "6.0", a smoothing gradient value that corresponds to the gradient calculation pixel R14 is "2.0", a smoothing gradient value that corresponds to the gradient calculation pixel R15 is "2.0", and a smoothing gradient value that corresponds to the gradient calculation pixel R16 is "2.0".

Figure 12:
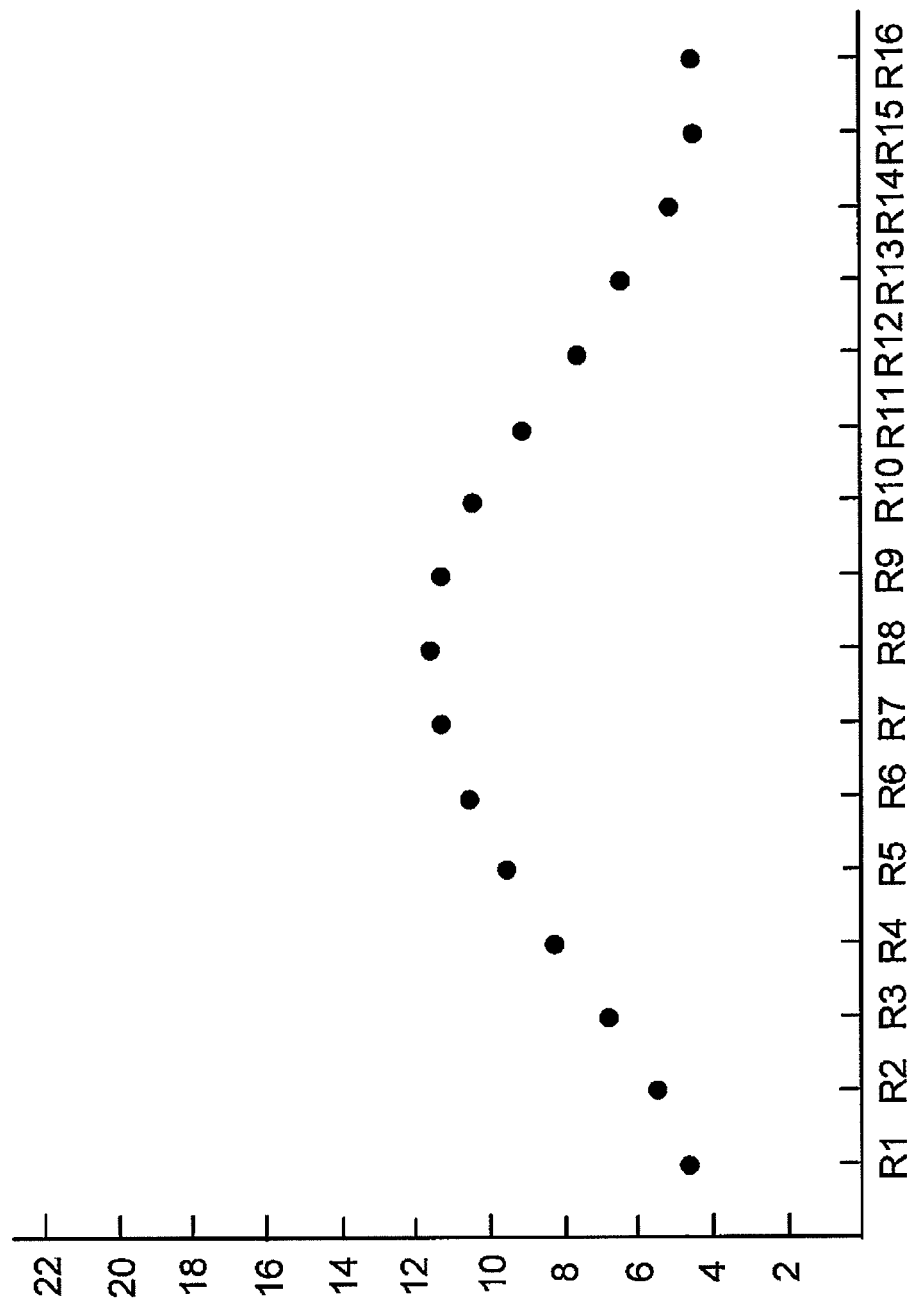
FIG. 12 is a diagram illustrating a smoothing gradient value group that is generated by applying a second moving average process on the smoothing gradient value group shown in FIG. 11.

FIG. 12 is a diagram illustrating a smoothing gradient value group that is generated by applying a second moving average process on a smoothing gradient value group shown in FIG. 11. The horizontal axis indicates the gradient calculation pixels R1 to R16 and the vertical axis indicates the gradient values.

The second moving average process section 5112d that is included in the smoothing process section 5112 applies a moving average process of developing a smoothing gradient value having a unique maximum value on the smoothing gradient value group after the quantization process is executed by the quantizing process section 5112c, thereby generating a new smoothing gradient value group. Here, with respect to the gradient calculation pixel to which the moving average process is to be applied, the nine smoothing gradient values including four prior smoothing gradient values and four subsequent smoothing gradient values and a smoothing gradient value corresponding to the gradient calculation pixel are used to calculate an average of the nine smoothing gradient values. As described above, since the smoothing process is a process that is applied to the gradient value group of the individual gradient values corresponding to the 16 gradient calculation pixels R1 to R16 when the 16 gradient calculation pixels R1 to R16 are arranged in the order of circumferentially surrounding the evaluation pixel Q1, the four prior smoothing gradient values and the four subsequent smoothing gradient values of the smoothing gradient value of the gradient calculation pixel R1 are smoothing gradient values that correspond to the gradient calculation pixels R13 to R16 and the gradient calculation pixels R2 to R5. In the same way, the four prior smoothing gradient values and the four subsequent smoothing gradient values of the smoothing gradient value of the gradient calculation pixel R16 are smoothing gradient values that correspond to the gradient calculation pixels R12 to R15 and the gradient calculation pixels R1 to R4. As shown in FIG. 12, in regards to the individual smoothing gradient values that constitute the smoothing gradient value group generated by the second moving average process section 5112d, a smoothing gradient value that corresponds to the gradient calculation pixel R1 is "4.7", a smoothing gradient value that corresponds to the gradient calculation pixel R2 is "5.6", a smoothing gradient value that corresponds to the gradient calculation pixel R3 is "6.9", a smoothing gradient value that corresponds to the gradient calculation pixel R4 is "8.2", a smoothing gradient value that corresponds to the gradient calculation pixel R5 is "9.6", a smoothing gradient value that corresponds to the gradient calculation pixel R6 is "10.4", a smoothing gradient value that corresponds to the gradient calculation pixel R7 is "11.3", a smoothing gradient value that corresponds to the gradient calculation pixel R8 is "11.8", a smoothing gradient value that corresponds to the gradient calculation pixel R9 is "11.3", a smoothing gradient value that corresponds to the gradient calculation pixel R10 is "10.4", a smoothing gradient value that corresponds to the gradient calculation pixel R11 is "9.1", a smoothing gradient value that corresponds to the gradient calculation pixel R12 is "7.8", a smoothing gradient value that corresponds to the gradient calculation pixel R13 is "6.4", a smoothing gradient value that corresponds to the gradient calculation pixel R14 is "5.1", a smoothing gradient value that corresponds to the gradient calculation pixel R15 is "4.7", and a smoothing gradient value that corresponds to the gradient calculation pixel R16 is "4.7". As such, if the second moving average process is applied by the second moving average process section 5112d, the smoothing gradient value "11.8" that corresponds to the gradient calculation pixel R8 is obtained as the smoothing gradient value that has the unique maximum value.

Figure 13:
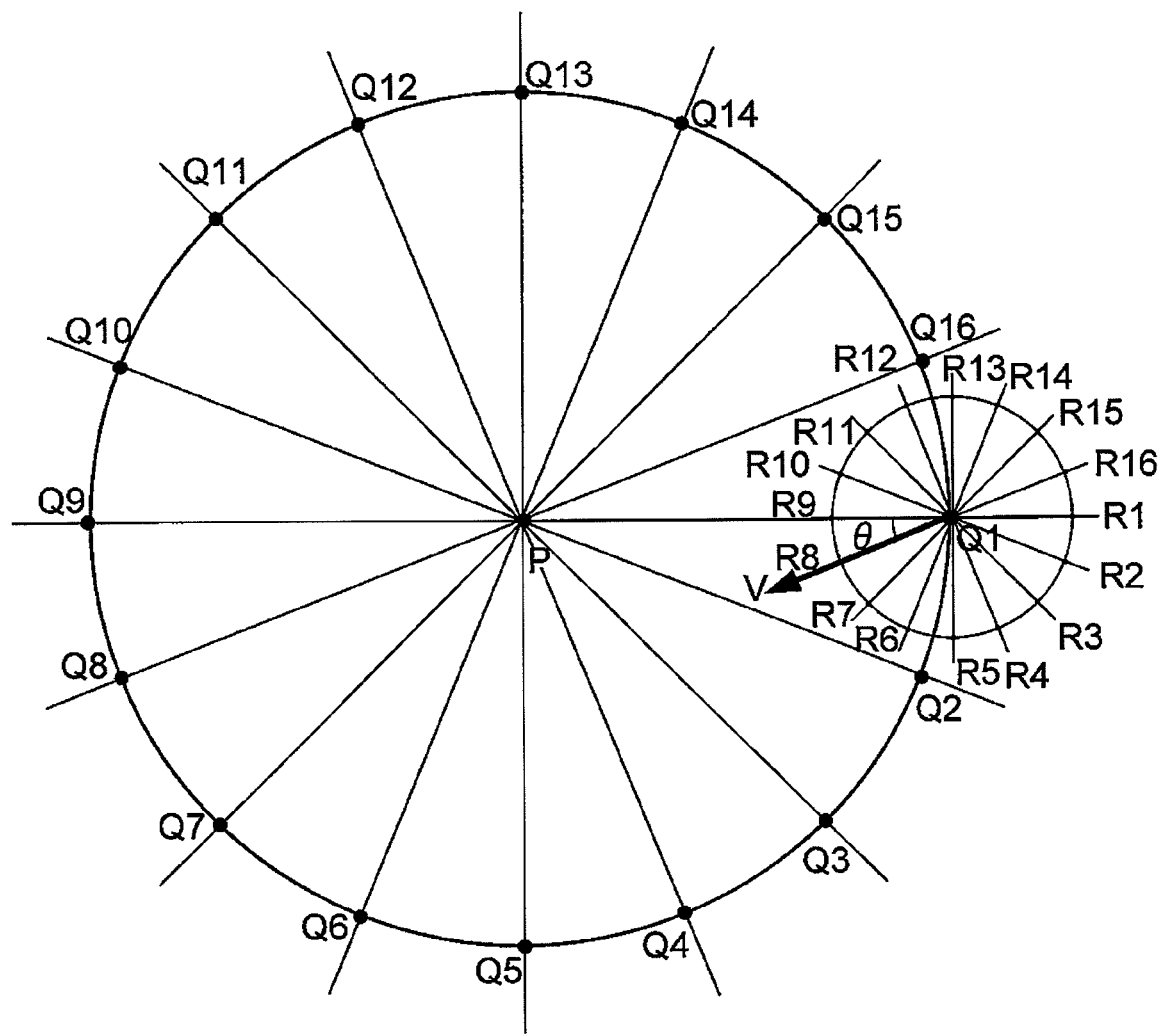
FIG. 13 is a diagram illustrating a gradient direction with respect to the evaluation pixel Q1.
Figure 14:
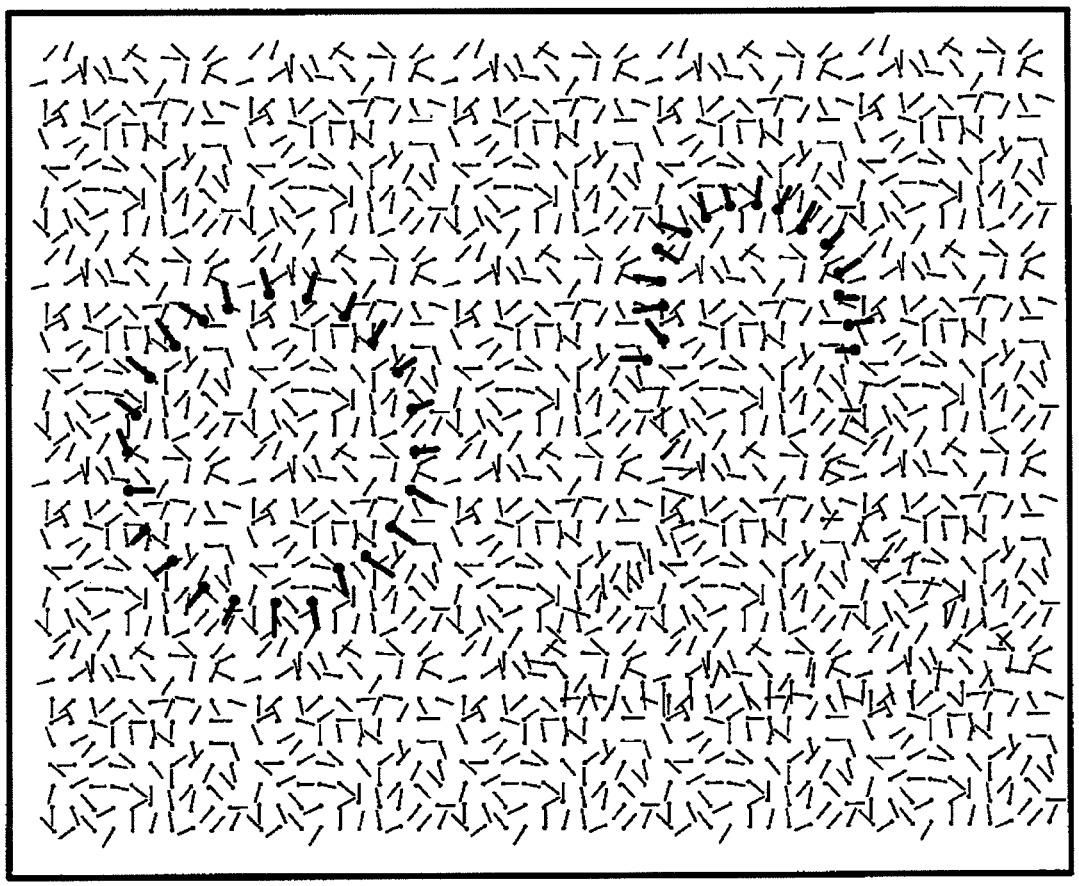
FIG. 14 is a diagram illustrating a gradient direction that is calculated for each of evaluation pixels over the entire area of the image shown in FIG. 6.

FIG. 13 is a diagram illustrating a gradient direction with respect to the evaluation pixel Q1. FIG. 14 is a diagram illustrating a gradient direction that is calculated for each of evaluation pixels arranged over an entire area of the image 60 shown in FIG. 6.

The gradient direction determining section 5113 that is included in the gradient direction calculating section 511 of the first evaluation value calculating section 510 determines as a gradient direction V with respect to the evaluation pixel Q1 a direction (shown by an arrow V in FIG. 13), in which the evaluation pixel Q1 and the gradient calculation pixel R8 corresponding to the maximum smoothing gradient value "11.8" among the smoothing gradient value group after the second moving average process is applied by the second moving average process section 5112d among the 16 gradient calculation pixels R1 to R16 that circumferentially surround the evaluation pixel Q1 are connected.

As described above, the calculation of the gradient direction V with respect to one evaluation pixel Q1 among the 16 evaluation pixels Q1 to Q16 that are arranged along the circle in which the pixel in interest P shown in FIG. 7 is centered and surround the pixel in interest P has been described. However, with respect to the other evaluation pixels Q2 to Q16 shown in FIG. 7, their gradient directions are calculated using the same way as the calculation of the gradient direction V with respect to the evaluation pixel Q1 that has been described with reference to FIGS. 7 to 13. In addition, with respect to the evaluation pixels that are arranged along the circle in which the pixel in interest P is centered in a radius different from that of the circle shown in FIG. 7 and surround the pixel in interest P or the evaluation pixels that surround the pixel in interest when one pixel among the plural pixels that represent the image 60 shown in FIG. 6 and have different locations from the location of the pixel in interest P shown in FIG. 7 is set as the pixel in interest, their gradient directions are calculated using the same way as the calculation of the gradient direction V with respect to the evaluation pixel that has been described with reference to FIGS. 7 to 13. FIG. 14 shows the gradient directions calculated using the above way with respect to the evaluation pixels that are arranged over the entire area of the image 60 shown in FIG. 6.

Next, with respect to each of the evaluation pixels that are arranged over the entire area of the image 60 shown in FIG. 6, the pixel evaluation value calculating section 512 that is included in the first evaluation value calculating section 510 calculates a pixel evaluation value based on an angle that is formed by a direction in which the current evaluation pixel and the pixel in interest and the gradient direction calculated by the gradient direction calculating section 511. As described above, the pixel evaluation values are used to evaluate whether each of the evaluation pixels arranged over an entire area of the image 60 shown in FIG. 6 is a pixel on a semicircle of 180° in which the predetermined pixel in interest is centered. In this embodiment, "angles in a range of 0 to 90 degrees" among the angles described above are set as the pixel evaluation values. Accordingly, the closer the pixel evaluation value is to "0", the more the gradient direction of the evaluation pixel having the pixel evaluation value is oriented to the predetermined pixel in interest.

FIG. 15 is a diagram illustrating an example of a table 70 that is stored in a table storage section 5121.

When the pixel evaluation value calculating section 512 of the first evaluation value calculating section 510 calculates the pixel evaluation values, the table storage section 5121 that is included in the pixel evaluation value calculating section 512 stores the table 70 common to the plural pixels in interest and the plural evaluation pixels in which table both of a first value that indicates a direction of the evaluation pixel when viewed from the pixel in interest and a second value that indicates a gradient direction of the evaluation pixel and a pixel evaluation value of the evaluation pixel are associated with each other. Here, the table 70 may be stored by the table storage section 5121 before calculating the specific pixel evaluation value of the evaluation pixel by the table referring section 5122 that is described later or may be stored by the table storage section 5121 before or after calculating the gradient direction by the gradient direction calculating section 511 of the first evaluation value calculating section 510.

In the table 70 shown in FIG. 15, the 16 directions from the pixel in interest P to the individual evaluation pixels Q1 to Q16 in FIG. 7 are represented as "PQ1, PQ2, PQ3, PQ4, PQ5, PQ6, PQ7, PQ8, PQ9, PQ10, PQ11, PQ12, PQ13, PQ14, PQ15, and PQ16", and are defined as the first values that indicate the directions of the evaluation pixels when viewed from the pixel in interest. In addition, the 16 directions from the evaluation pixel Q1 to the individual gradient calculation pixels R1 to R16 in FIG. 7 are represented as "QR1, QR2, QR3, QR4, QR5, QR6, QR7, QR8, QR9, QR10, QR11, QR12, QR13, QR14, QR15, and QR16", and are defined as the second values that indicate the gradient directions of the evaluation pixels. In the table 70 shown in FIG. 15, both the first values and the second values are associated with the "angles in a range of 0 to 90 degrees" that are the pixel evaluation values of the evaluation pixels. In addition, in the table 70 shown in FIG. 15, some of the pixel evaluation values among the pixel evaluation values are shown, and the table 70 that is actually stored in the table storage section 5121 has all of the pixel evaluation values that are associated with both the first values and the second values.

Since the table 70 is stored in the table storage section 5121, a calculation process becomes unnecessary when the pixel evaluation value is actually calculated. Since the pixel evaluation value can be calculated by referring to the table 70, thereby contributing to a high speed process is enabled.

The table referring section 5122 that is included in the pixel evaluation value calculating section 512 of the first evaluation value calculating section 510 calculates a pixel evaluation value of the evaluation pixel from the table 70 shown in FIG. 15, on the basis of the specific first values that indicate the directions of the evaluation pixels when the specific evaluation pixels are viewed from the specific pixel in interest and the specific second values that indicate the gradient directions of the evaluation pixels.

For example, in the case of the gradient direction V with respect to the evaluation pixel Q1 that has been described with reference to FIGS. 7 to 13, as shown in FIG. 13, the first value is "PQ1", and the second value is "QR8". On the basis of the specific first value and the specific second value, the pixel evaluation value of the evaluation pixel Q1 is calculated as "22.5", from the table 70 shown in FIG. 15.

With respect to the other evaluation pixels Q2 to Q16 that are shown in FIG. 7, the individual pixel evaluation values are calculated from the table 70 shown in FIG. 15.

Next, the second evaluation value calculating section 520 performs a process of integrating plural pixel evaluation values corresponding to the evaluation pixels Q1 to Q9, for example, that are the plural evaluation pixels on a semicircle of 180° overlapping a circle shown in FIG. 7 and calculating an integrated evaluation value to evaluate whether the semicircle of 180° is a semicircle of 180° corresponding to a similar semicircular shape, for each of the plural semicircles of 180° that overlap the circle and have phases different from each other. Here, an average value of the plural pixel evaluation values is used as the integrated evaluation value. In addition, with respect to the evaluation pixels that are arranged along the circle in which the pixel in interest P is centered in a radius different from that of the circle shown in FIG. 7 and surround the pixel in interest P or the evaluation pixels that surround the pixel in interest when one pixel among the plural pixels that represent the image 60 shown in FIG. 6 and have different locations from the location of the pixel in interest P shown in FIG. 7 is set as the pixel in interest, the second evaluation value calculating section 520 calculates an integrated evaluation value.

Next, the circular arc extracting section 530 compares the plural integrated evaluation values that correspond to the plural semicircles of 180°, and extracts the semicircle of 180° with which an integrated evaluation value indicating the most approximation to the similar semicircular shape is associated, from the plural semicircles of 180°. As described above, among the angles that are formed by the directions in which the evaluation pixels and the predetermined pixel in interest are connected and the gradient directions calculated by the gradient direction calculating section 511, the "angles in a range of 0 to 90°" are set as the pixel evaluation values. Accordingly, the closer the integrated evaluation value that is an average value of the plural pixel evaluation values is to "0", the closer the semicircle of 180° with which the integrated evaluation value is associated is to the similar semicircular shape. The circular arc extracting section 530 extracts the semicircle of 180°.

Among the gradient directions that are shown in FIG. 14, gradient directions that are shown by thick lines indicate gradient directions with respect to the plural evaluation pixels on the semicircle of 180° that are extracted by the circular arc extracting section 530.

As described above, according to the similar semicircle detecting apparatus 500 according to the embodiment that is obtained when the similar semicircle detecting program 400 shown in FIG. 4 is loaded in the personal computer 30 shown in FIGS. 1, 2, and 3 and the similar semicircle detecting program 400 is executed in the personal computer 30, the similar semicircular shape that is similar to the semicircular shape can be detected from the image represented by the pixels that are two-dimensionally arranged. In addition, since an outline of the upper portion of the head portion of the person has a similar semicircular shape similar to the semicircular shape, it is possible to detect the head portion of the person in the angle of view from the detected similar semicircular shape.

In addition, since the extracted object is not a circle but a circular arc, a direction in which the predetermined pixel in interest and the center of the extracted circular arc are connected can be specified, and a slope of the detected similar semicircular shape, that is, a slope of the head portion can be obtained from the specified direction.

In the embodiment, the case where the "circular arc" according to the invention is a semicircle of 180° has been exemplified, but the "circular arc" according to the invention is not limited thereto. For example, the circular arc according to the invention may be a circular arc that has an angle of 90°, 270° or the like that is different from the angle of 180°.

Further, in the embodiment, the case where the "characteristic amount" according to the invention is a luminance value has been exemplified, but the "characteristic amount" according to the invention is not limited thereto. For example, the characteristic amount according to the invention may be a chromaticity value or a combination of a luminance value and a chromaticity value. In addition, when the luminance value and the chromaticity value are combined, a weight may be given to the luminance value. In addition, R, G, and B may be equally handled or a weight may be given to the G.

Furthermore, in the embodiment, the case where the pixel evaluation value calculating section 512 calculates the pixel evaluation value after the gradient direction calculating section 511 according to the invention calculates a gradient direction for each of the evaluation pixels arranged over the entire area of the image has been exemplified. However, the present invention is not limited thereto. For example, the pixel evaluation value calculating section 512 may calculate the pixel evaluation value whenever the gradient direction calculating section 511 according to the invention calculates a gradient direction with respect to one evaluation pixel.

Furthermore, in the embodiment, the case where the "pixel evaluation value" according to the invention is an angle in a range of (0 to 90°) has been exemplified. However, the "pixel evaluation value" according to the invention is not limited thereto. For example, cosine of the angle in the range of (0 to 90°) may be calculated. Alternatively, another evaluation value that indicates a degree to which a gradient is oriented to a direction of a pixel in interest may be used.

Furthermore, in the embodiment, the case where the "integrated evaluation value" according to the invention is equally handled over the entire area of the circular arc has been exemplified. However, the "integrated evaluation value" according to the invention is not limited thereto. For example, a large weight may be given as goes to the center of the circular arc. Alternatively, an evaluation value based on another algorithm, for example, a count value that is obtained by counting the number of evaluation pixels where a gradient direction is oriented to a direction of a pixel in interest in the predetermined angle range (for example, within ±10 degrees) may be used.

What is claimed is:

1. A similar semicircle detecting apparatus that detects a similar semicircular shape similar to a semicircular shape from an image represented by pixels which are two-dimensionally arranged, the similar semicircle detecting apparatus comprising:

a first evaluation value calculating means for calculating a pixel evaluation value to evaluate whether a current evaluation pixel is a pixel on a circular arc in which a predetermined pixel in interest is centered, for each of a plurality of evaluation pixels which are arranged along a circle in which the predetermined pixel in interest is centered and surround the predetermined pixel in interest;

a second evaluation value calculating means for performing a process of integrating plural pixel evaluation values corresponding to the plurality of evaluation pixels on the circular arc overlapping the circle so as to calculate an integrated evaluation value to evaluate whether the circular arc is a circular arc corresponding to the similar semicircular shape, for each of a plurality of circular arcs which overlap the circle in overlapping phases which are different from each other; and a circular arc extracting means for comparing a plurality of integrated evaluation values corresponding to the plural circular arcs, and extracts the circular arc with which the integrated evaluation value indicating the most approximation to the similar semicircular shape is associated, from the plural circular arcs.

2. The similar semicircle detecting apparatus according to claim 1, wherein the first evaluation value calculating means includes:

a gradient direction calculating means for calculating a gradient direction where a characteristic amount on the image varies, for each of the plurality of evaluation pixels; and a pixel evaluation value calculating means for calculating the pixel evaluation value based on an angle which is formed between a line connecting the current evaluation pixel and the predetermined pixel in interest and a ray formed in a direction of the gradient direction of the current evaluation pixel calculated by the gradient direction calculating means, for each of the plurality of evaluation pixels.

3. The similar semicircle detecting apparatus according to claim 2, wherein the gradient direction calculating means includes:

a gradient value calculating means for calculating each gradient value on the basis of a difference between a characteristic amount of the current evaluation pixel and a characteristic amount of each of a plurality of gradient calculation pixels which circumferentially surround the current evaluation pixel;

a smoothing process means for generating a smoothing gradient value group by applying a smoothing process to a gradient value group in which the gradient values each corresponding to each of the plurality of gradient calculation pixels are arranged in an order in which the plurality of gradient calculation pixels circumferentially surround the current evaluation pixel; and a gradient direction determining means for determining as the gradient direction a direction in which the current evaluation pixel and the gradient calculation pixel corresponding to the maximum smoothing gradient value in the smoothing gradient value group among the plurality of gradient calculation pixels which circumferentially surround the current evaluation pixel.

4. The similar semicircle detecting apparatus according to claim 3,
wherein the smoothing process means includes:
a high value suppressing process means for replacing the gradient value exceeding a predetermined threshold value among the individual gradient values constituting the gradient value group with the predetermined threshold value.

5. The similar semicircle detecting apparatus according to claim 3,
wherein the smoothing process means applies a moving average process of suppressing a noise to the gradient value group.

6. The similar semicircle detecting apparatus according to claim 3,
wherein the smoothing process means includes:
a quantizing process means for replacing each of the gradient values constituting the gradient value group by any one of the plural gradient values that have values approximated to the gradient values and are discretely set, and generates a new gradient value group.

7. The similar semicircle detecting apparatus according to claim 3,
wherein the smoothing process means applies a moving average process of developing a gradient value having a unique maximum value in the gradient value group.

8. The similar semicircle detecting apparatus according to claim 2,
wherein the pixel evaluation value calculating means includes:
a table storage means for storing a table common to a plurality of pixels in interest and a plurality of evaluation pixels in which the table associates pixel evaluation values for a plurality of evaluation pixels with both of first values and second values, wherein each of the first values indicate a direction of an evaluation pixel when viewed from a pixel in interest, and wherein each of the second values indicate a gradient direction of an evaluation pixel; and a table referring means for calculating a pixel evaluation value of the current evaluation pixel from the table based on a specific first value which indicates the direction of the current evaluation pixel when the current evaluation pixel is viewed from the predetermined pixel in interest and a specific second value that indicates the gradient direction of the current evaluation pixel.

9. A non-transitory computer-readable storage medium that stores a similar semicircle detecting program that is executed in a computer and causes the computer to operate as a similar semicircle detecting apparatus which detects a similar semicircular shape similar to a semicircular shape from an image represented by pixels arranged two-dimensionally, the similar semicircle detecting apparatus including:
a first evaluation value calculating means for calculating a pixel evaluation value to evaluate whether a current evaluation pixel is a pixel on a circular arc in which a predetermined pixel in interest is centered, for each of a plurality of evaluation pixels which are arranged along a circle in which the predetermined pixel in interest is centered and surround the predetermined pixel in interest;
a second evaluation value calculating means for performing a process of integrating plural pixel evaluation values corresponding to the plurality of evaluation pixels on the circular arc overlapping the circle so as to calculate an integrated evaluation value to evaluate whether the circular arc is a circular arc corresponding to the similar semicircular shape, for each of a plurality of circular arcs which overlap the circle in overlapping phases which are different from each other; and
a circular arc extracting means that compares a plurality of integrated evaluation values corresponding to the plural circular arcs, and extracts the circular arc with which the integrated evaluation value indicating the most approximation to the similar semicircular shape is associated, from the plural circular arcs.

* * * * *